US012621058B2

(12) United States Patent
Omiya

(10) Patent No.: US 12,621,058 B2
(45) Date of Patent: May 5, 2026

(54) OPTICAL COMMUNICATION APPARATUS, OPTICAL COMMUNICATION SYSTEM, AND OPTICAL COMMUNICATION METHOD

(71) Applicant: NEC Corporation, Tokyo (JP)

(72) Inventor: Tatsunori Omiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 244 days.

(21) Appl. No.: 18/384,127

(22) Filed: Oct. 26, 2023

(65) Prior Publication Data

US 2024/0154704 A1 May 9, 2024

(30) Foreign Application Priority Data

Nov. 8, 2022 (JP) ................................ 2022-178557

(51) Int. Cl.
*H04B 10/61* (2013.01)
*H04J 14/02* (2006.01)

(52) U.S. Cl.
CPC .......... *H04B 10/61* (2013.01); *H04J 14/0221* (2013.01)

(58) Field of Classification Search
CPC ...... H04B 10/61; H04B 10/40; H04B 10/615; H04B 10/616; H04B 10/63; H04B 10/64; H04B 10/65; H04B 10/564; H04J 14/0221; H04J 2203/006
See application file for complete search history.

(56) References Cited

U.S. PATENT DOCUMENTS 9,806,806 B1 * 10/2017 Rohde ................ H04B 10/6164
2011/0188866 A1 * 8/2011 Maeda .............. H04B 10/6164 398/202
2020/0064404 A1 * 2/2020 Sugiyama ........... G01R 31/282

FOREIGN PATENT DOCUMENTS

JP 2017-511036 A 4/2017

* cited by examiner

*Primary Examiner* — Hibret A Woldekidan
(74) *Attorney, Agent, or Firm* — Sughrue Mion, PLLC

(57) ABSTRACT

There are provided an optical communication apparatus, an optical communication system, and an optical communication method that are capable of suppressing deterioration in quality of an output signal.

An optical relay apparatus includes a coherent receiver front-end unit that coherently detects an input optical signal to be input, based on local oscillation light, a coherent transmitter front-end unit that coherently modulates and outputs the coherently detected signal, a wavelength meter that monitors a characteristic of the input optical signal, and a wavelength conversion control unit that controls a characteristic of the local oscillation light, based on the monitored characteristic.

17 Claims, 17 Drawing Sheets

OPTICAL COMMUNICATION APPARATUS, OPTICAL COMMUNICATION SYSTEM, AND OPTICAL COMMUNICATION METHOD

INCORPORATION BY REFERENCE

This application is based upon and claims the benefit of priority from Japanese patent application No. 2022-178557, filed on Nov. 8, 2022, the disclosure of which is incorporated herein in its entirety by reference.

TECHNICAL FIELD

The present disclosure relates to an optical communication apparatus, an optical communication system, and an optical communication method.

BACKGROUND ART

In recent years, utilization of not only wireless communication but also optical communication for various communication services is expected toward a post-5G era. Among them, studies have been carried out for enhancement of reconfigurable optical add/drop multiplexer (ROADM) networks, and in particular, attention has been paid to a wavelength-conversion technique required at a time of path change.

As a related art, for example, Published Japanese Translation of PCT International Publication for Patent Application No. 2017-511036 discloses a wavelength converter that converts a wavelength of an optical signal by a reception end and a transmission end using a coherent method.

SUMMARY

According to Published Japanese Translation of PCT International Publication for Patent Application No. 2017-511036, in a wavelength converter, a reception end including a coherent detection front-end module converts a received optical signal into an analog electric signal, and a transmission end including an optical modulation module converts the analog electric signal into a transmitted optical signal. However, Published Japanese Translation of PCT International Publication for Patent Application No. 2017-511036 does not consider fluctuation in characteristics such as a wavelength and power of an optical signal being input, and therefore there is a problem that quality of an output signal may deteriorate.

In view of such a problem, an example object of the present disclosure is to provide an optical communication apparatus, an optical communication system, and an optical communication method that are capable of suppressing deterioration in quality of an output signal.

In a first example aspect according to the present disclosure, an optical communication apparatus includes: a coherent detection unit configured to coherently detect an input optical signal to be input, based on local oscillation light; a coherent modulation unit configured to coherently modulate and output the coherently detected signal; a first monitoring unit configured to monitor a characteristic of the input optical signal; and a control unit configured to control a characteristic of the local oscillation light, based on the monitored characteristic.

In a second example aspect according to the present disclosure, an optical communication system includes a plurality of optical communication apparatuses, and the plurality of optical communication apparatuses each include: a coherent detection unit configured to coherently detect an input optical signal to be input, based on local oscillation light; a coherent modulation unit configured to coherently modulate and output the coherently detected signal; a first monitoring unit configured to monitor a characteristic of the input optical signal; and a control unit configured to control a characteristic of the local oscillation light, based on the monitored characteristic.

In a third example aspect according to the present disclosure, an optical communication method includes: coherently detecting an input optical signal to be input, based on local oscillation light; coherently modulating and outputting the coherently detected signal; monitoring a characteristic of the input optical signal; and controlling a characteristic of the local oscillation light, based on the monitored characteristic.

BRIEF DESCRIPTION OF DRAWINGS

The above and other aspects, features, and advantages of the present disclosure will become more apparent from the following description of certain example embodiments when taken in conjunction with the accompanying drawings, in which.

EXAMPLE EMBODIMENT

Figure 1:
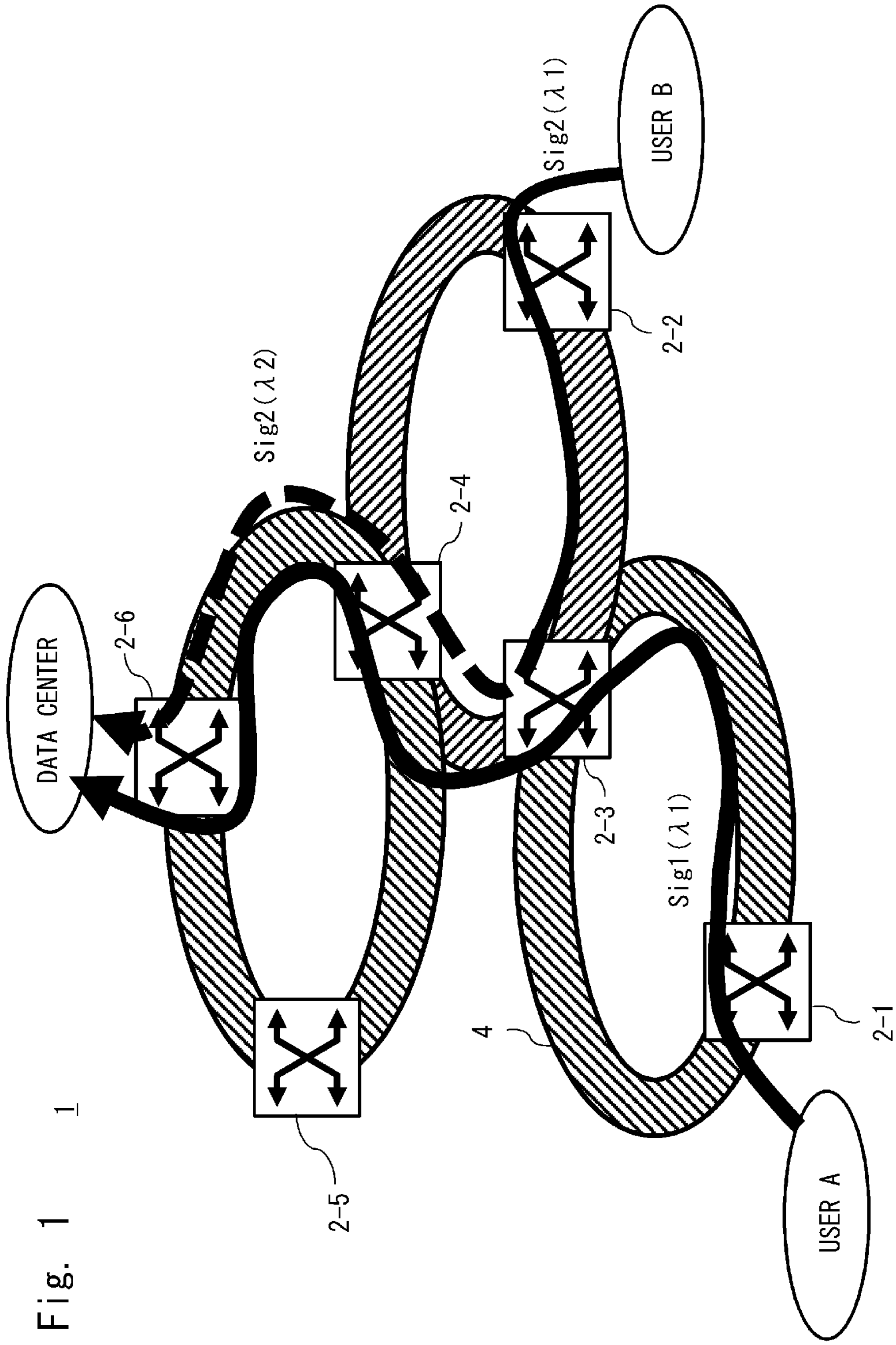
FIG. 1 is a configuration diagram illustrating a configuration example of an optical communication system according to some example embodiments.

Hereinafter, example embodiments will be described with reference to the drawings. In the drawings, the same or associated elements are denoted by the same reference numeral, and redundant description thereof is omitted as necessary for clarity of description. Note that an arrow illustrated in the drawings is an illustrative example, and does not limit a type or direction of a signal.

First Embodiment

Hereinafter, a first example embodiment will be described with reference to the drawings.

<Description of Configuration>

FIG. 1 illustrates a configuration example of an optical communication system according to some example embodiments. An optical communication system 1 is, for example, a backbone wavelength multiplex optical transmission system, and performs large-capacity communication in excess of 100 Gbps or in a class of 1 Tbps by performing wavelength multiplexing and performing digital coherent transmission on optical signals of wavelengths. By wavelength multiplexing, it is possible to improve a frequency utilization efficiency of light, and it is possible to cope with mobile traffic and wavelength defragmentation. In addition, since a transmission path or a wavelength path can be flexibly switched as an optical signal by wavelength multiplexing, the infrastructure can be maintained by switching and bypassing the transmission path in a case of transmission congestion or failure. In addition, in this example, real-time performance is improved toward Beyond 5G era, and it is possible to cope with an ultra-low latency.

In the example of FIG. 1, the optical communication system 1 includes a plurality of optical relay apparatuses 2 (for example, 2-1 to 2-6) that are connected via an optical fiber transmission path 4 in such a way as to be capable of optical communication. The optical relay apparatus 2 is a photonic node capable of relaying a wavelength-multiplexed optical signal, i.e., an optical communication apparatus. In this example, the optical relay apparatuses 2-1 to 2-6 constitute a ring-type network including three rings, but may constitute a network of other topologies.

For example, the optical relay apparatus 2-1 accommodates a network of a user A, the optical relay apparatus 2-2 accommodates a network of a user B, and the optical relay apparatus 2-6 accommodates a network of a data center. At this time, it is assumed that a path of Sig1 is set at a wavelength λ1 in order for the user A to access the data center. The path of Sig1 includes the optical relay apparatuses 2-1, 2-3, 2-4, and 2-6. At the same time, it is assumed that a path of Sig2 is set at a wavelength λ1 in order for the user B to access the data center. The path of Sig2 includes the optical relay apparatuses 2-2, 2-3, 2-4, and 2-6. Then, in the optical relay apparatus 2-3, collision between the wavelength λ1 of Sig1 and the wavelength λ1 of Sig2 occurs. In this case, a method of avoiding a collision by switching the path of Sig2 to another path is conceivable, but a wavelength slot of another path is not always empty.

Therefore, as illustrated in FIG. 1, an inventor has studied a method of converting an optical signal into an empty wavelength slot (λ2) by a wavelength converter in the optical relay apparatus 2-3. As an example of the wavelength conversion method, a method of performing optical remodulation at a new wavelength after demodulation to a digital signal once via a transponder is conceivable. However, this approach requires complex digital signal processing, error-correction processing, and the like via a digital signal processor (DSP), which results in a delay in the signal.

Figure 2:
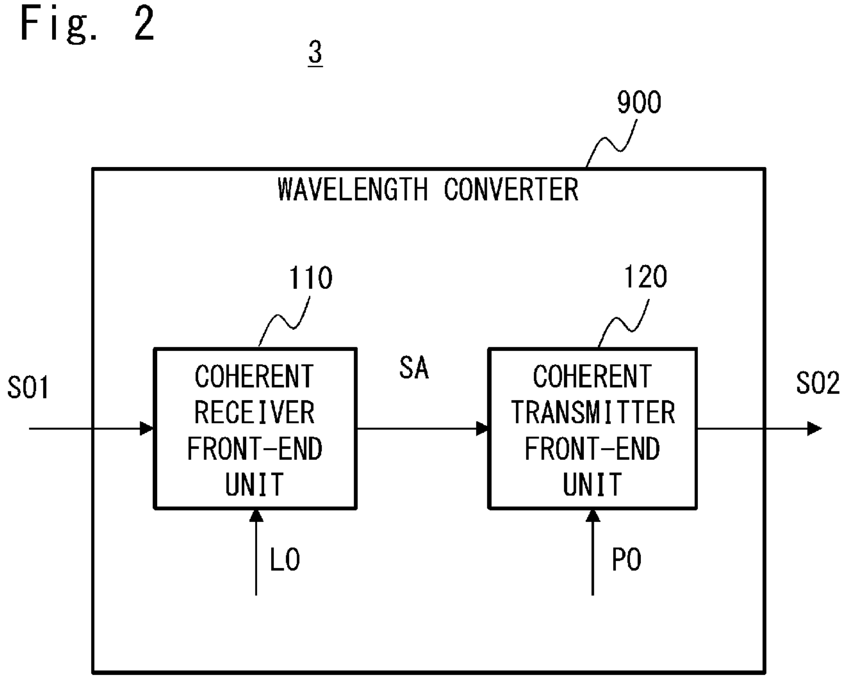
FIG. 2 is a configuration diagram illustrating a configuration example of a related optical relay apparatus.

On the other hand, a method of performing wavelength conversion using the configuration illustrated in FIG. 2 is conceivable. FIG. 2 illustrates a configuration example of a wavelength converter 900 in the related optical relay apparatus 3. In this example, an optical signal detected by a coherent receiver front-end unit is optically modulated again at another wavelength by a coherent transmitter front-end unit, thereby achieving a wavelength conversion method that suppresses an increase in latency that occurs when the wavelength of the optical signal is converted.

As illustrated in FIG. 2, the related wavelength converter 900 includes a coherent receiver front-end unit 110 and a coherent transmitter front-end unit 120. The coherent receiver front-end unit 110 coherently detects an input optical signal SO1 received from an optical relay apparatus of a preceding stage by local oscillation light LO having a predetermined wavelength, and outputs a detected analog electric signal SA to the coherent transmitter front-end unit 120. The coherent transmitter front-end unit 120 optically modulates (coherently modulates) the analog electric signal SA coherently detected by the coherent receiver front-end unit 110 with transmission light PO having a predetermined wavelength, and transmits a generated output optical signal SO2 to an optical relay apparatus of a next stage. Since the related wavelength converter 900 is constituted by an analog circuit that does not perform digital processing, wavelength conversion can be achieved at low delay and low cost. On the other hand, since the related wavelength converter 900 does not perform digital signal processing, it is difficult to manage and control power and quality information of an optical signal being input.

Figure 3:
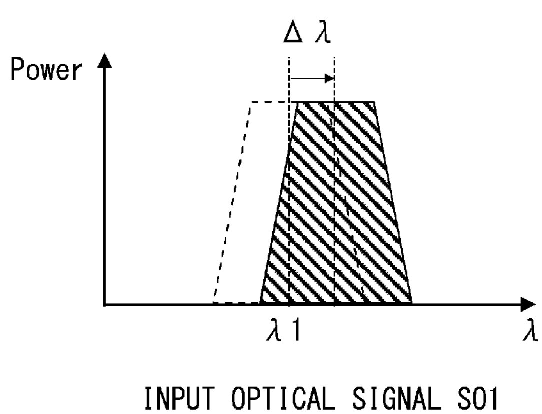
FIG. 3 is a characteristic diagram for describing a problem of the related optical relay apparatus.
Figure 4:
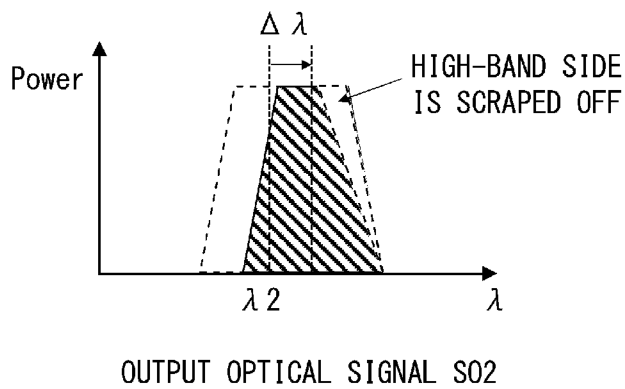
FIG. 4 is a characteristic diagram for describing a problem of the related optical relay apparatus.

The inventor has studied the configuration in FIG. 2 and found the following problems. FIGS. 3 and 4 illustrate problems when an input wavelength, which is a wavelength of the input optical signal SO1, drifts in the related wavelength converter 900 in FIG. 2. In this example, the wavelength converter 900 converts an input wavelength λ1 to an output wavelength λ2. For example, as illustrated in FIG. 3, it is assumed that the wavelength of the input optical signal SO1 drifts from λ1 to +Δλ. Then, as illustrated in FIG. 4, the wavelength of the output optical signal SO2 drifts from λ2 by +Δλ, and a high-band side of a spectrum is scraped off. In other words, since an analog circuit constituting the wavelength converter (for example, an analog device included in the coherent receiver front-end unit) has an input/output characteristic of a predetermined band, a frequency component deviating from the predetermined band is filtered. For example, when the input wavelength drifts to a negative side, a low-band side of a spectrum of the output optical signal is also scraped off. Also, when power of the input optical signal fluctuates, quality of the output optical signal similarly deteriorates. For example, when the power of the input optical signal is outside a range that can be input to an input device, there is also a possibility that the signal may be deteriorated or the input device may be destroyed.

As described above, in the related technique as illustrated in FIG. 2, when the power and the wavelength of the input optical signal do not exactly match the set value, the quality of the optical signal being output deteriorates, and thus there is a problem that a normal wavelength conversion operation is not performed. This is because, since the related wavelength converter does not have a mechanism for detecting the power and wavelength of the optical signal to be input, it is difficult to adjust the wavelength and power of the local oscillation light inside the wavelength converter to the input light when the power and wavelength of the optical signal to be input are different from those assumed. Further, in this case, since a signal that has not been normally converted, i.e., a signal whose quality has deteriorated is output from the wavelength converter, there is a possibility of affecting the optical network to be connected to the subsequent stage, which is also a problem.

Therefore, in this example, even when the wavelength or the power of the optical signal being input to the wavelength converter deviates from the set value, it is possible to suppress the quality deterioration of the optical signal being output and to control the inside of the wavelength converter in such a way that the wavelength conversion operation operates normally.

Figure 5:
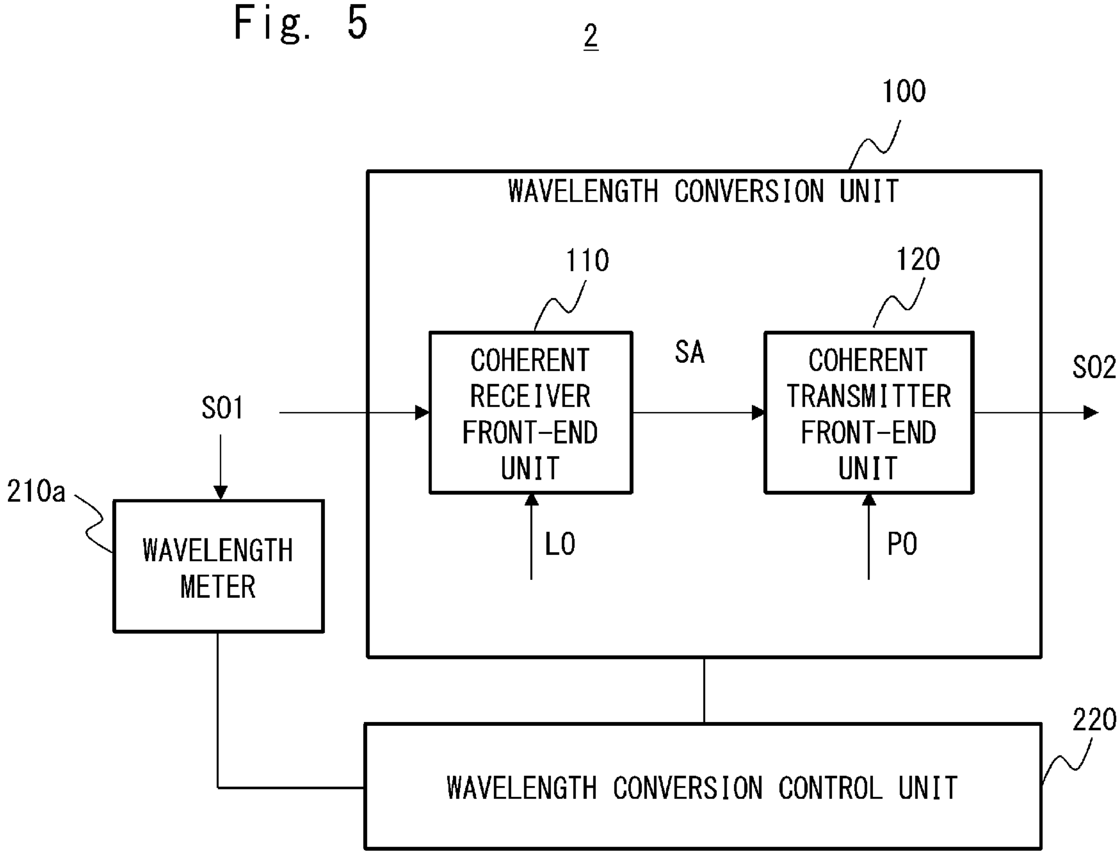
FIG. 5 is a configuration diagram illustrating a schematic configuration of an optical relay apparatus according to some example embodiments.

FIG. 5 illustrates an outline of the configuration of the optical relay apparatus 2 according to some example embodiments. In the example of FIG. 5, the optical relay apparatus 2 includes a coherent receiver front-end unit 110, a coherent transmitter front-end unit 120, a wavelength meter 210*a*, and a wavelength conversion control unit 220.

The coherent receiver front-end unit 110 and the coherent transmitter front-end unit 120 have the same configuration as that of FIG. 2, and constitute, for example, a wavelength conversion unit 100. In other words, the coherent receiver front-end unit 110 is an optical/electric conversion unit that converts an optical signal into an electric signal, and is a coherent detection unit that performs coherent detection. The coherent receiver front-end unit 110 coherently detects the input optical signal SO1 being input, based on the local oscillation light LO, and outputs the generated analog electric signal SA.

The coherent transmitter front-end unit 120 is an electric/optical conversion unit that converts an electric signal into an optical signal, and is a coherent modulation unit that performs coherent modulation. The coherent transmitter front-end unit 120 coherently modulates the analog electric signal SA generated by the coherent receiver front-end unit 110, based on the transmission light PO, and outputs the generated output optical signal SO2. Note that a signal based on the analog electric signal SA generated by the coherent receiver front-end unit 110 may be input to the coherent transmitter front-end unit 120. For example, a signal acquired by performing analog signal processing such as predetermined compensation processing by an analog circuit on the analog electric signal SA may be input to the coherent transmitter front-end unit 120.

A frequency (wavelength) of the local oscillation light LO is a frequency (wavelength) of the input optical signal SO1 to be received, and a frequency of the transmission light PO is a frequency of the output optical signal SO2 to be transmitted. Note that, although description is given as a "frequency" of the signal or a "wavelength" of the signal, "frequency" and "wavelength" can be read from each other. For example, the local oscillation light LO and the transmission light PO have different frequencies, but may have the same frequency. By changing the frequencies of the local oscillation light LO and the transmission light PO, the wavelength of the optical signal can be switched. In other words, the input optical signal SO1 can be converted into the output optical signal SO2 having a different wavelength.

The wavelength meter 210*a* is a monitoring unit that monitors a characteristic of the input optical signal SO1 being input to the coherent receiver front-end unit 110. For example, the wavelength meter 210*a* may monitor either or both of the wavelength and the power (also referred to as optical power) of the input optical signal SO1 as an example of the characteristic.

The wavelength conversion control unit 220 is a control unit that controls a characteristic of the local oscillation light LO being input to the coherent receiver front-end unit 110, based on the characteristic monitored by the wavelength meter 210*a*. For example, the wavelength conversion control unit 220 may control the wavelength of the local oscillation light LO in response to the wavelength of the input optical signal SO1 monitored by the wavelength meter 210*a*. Further, the wavelength conversion control unit 220 may control the power of the local oscillation light LO or the input optical signal SO1 in response to the power of the input optical signal SO1 monitored by the wavelength meter 210*a*. Further, the wavelength conversion control unit 220 may control the wavelength of the transmission light PO being input to the coherent transmitter front-end unit 120.

Figure 6:
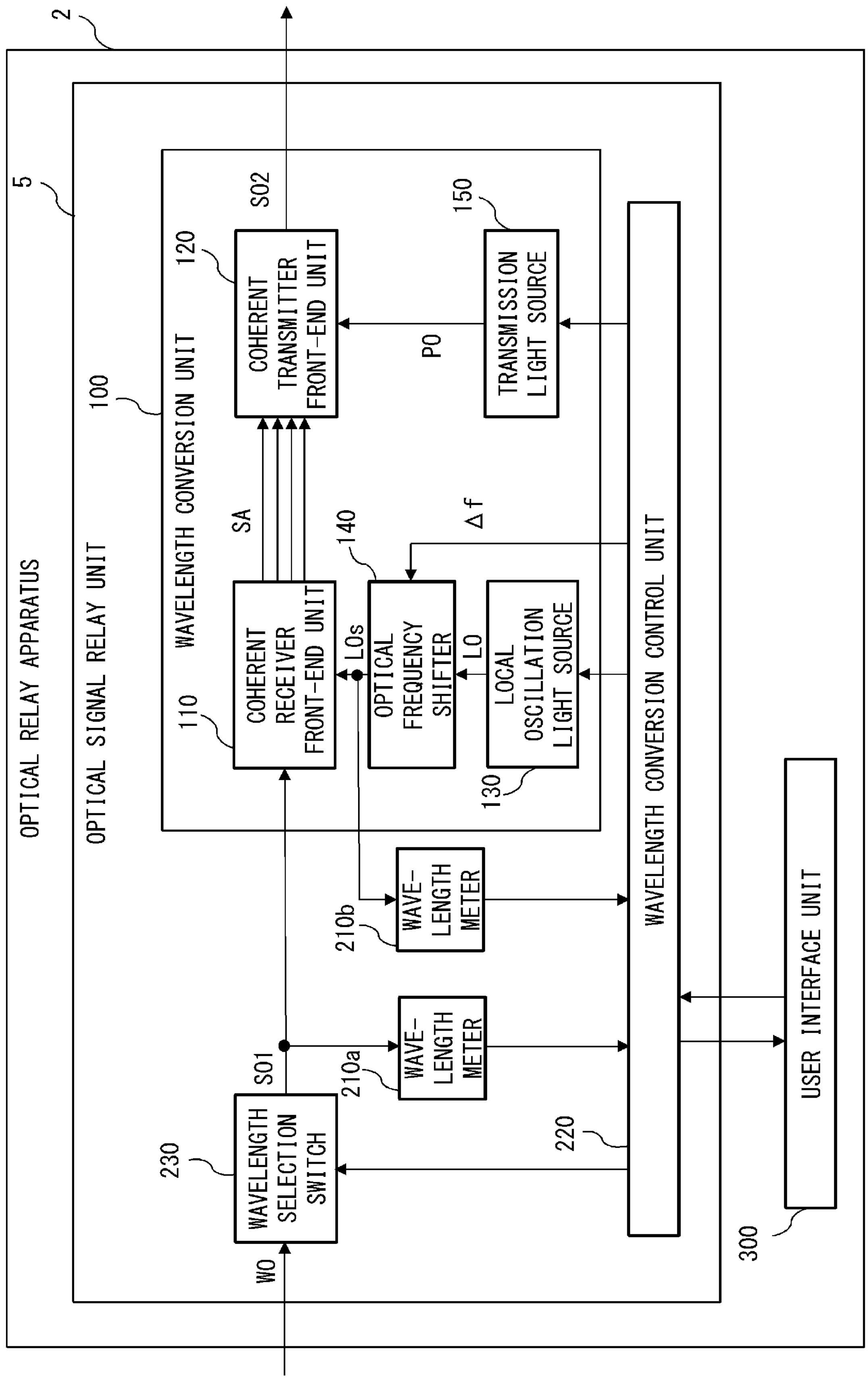
FIG. 6 is a configuration diagram illustrating a specific configuration example of the optical relay apparatus according to some example embodiments.

FIG. 6 illustrates a specific configuration example of the optical relay apparatus 2 according to some example embodiments. In the example of FIG. 6, the optical relay apparatus 2 includes a wavelength conversion unit 100, wavelength meters 210*a* and 210*b*, a wavelength conversion control unit 220, a wavelength selection switch 230, and a user interface unit 300. For example, the wavelength conversion unit 100, the wavelength meters 210*a* and 210*b*, the wavelength conversion control unit 220, and the wavelength selection switch 230 constitute an optical signal relay unit 5 that performs conversion and relay of a predetermined wavelength. The optical relay apparatus 2 may include a plurality of optical signal relay units 5.

In this example, a wavelength multiplexed signal WO is input to the optical signal relay unit 5 from the optical relay apparatus 2 of the preceding stage via the optical fiber transmission path 4. For example, the wavelength multiplexed signal WO may be wavelength-separated from the optical fiber transmission path 4 via a coupler (demultiplexer) or other wavelength selection switch, and then input to the optical signal relay unit 5.

The wavelength selection switch 230 is a switch for selecting and outputting an optical signal having a predetermined wavelength from optical signals being input. The wavelength selection switch 230 selects an optical signal having a wavelength set by the wavelength conversion control unit 220. For example, the wavelength selection switch 230 selects and extracts a predetermined wavelength from the wavelength multiplexed signal WO being input, and outputs the extracted single-channel optical signal as the input optical signal SO1. The wavelength selection switch 230 includes a function of an attenuator that attenuates an optical signal. For example, the wavelength selection switch 230 attenuates the optical power of the selected optical signal by an attenuation amount set by the wavelength conversion control unit 220, and outputs the attenuated optical signal.

The wavelength conversion unit 100 converts the wavelength of the input optical signal SO1 being input from the wavelength selection switch 230, and outputs the output optical signal SO2 after the wavelength conversion to the optical relay apparatus 2 of a subsequent stage via the optical fiber transmission path 4. For example, the output optical signal SO2 may be wavelength-multiplexed via a coupler (multiplexer) or another wavelength selection switch, and then output to the optical fiber transmission path 4.

The wavelength conversion unit 100 includes a coherent receiver front-end unit 110, a coherent transmitter front-end unit 120, a local oscillation light source 130, an optical frequency shifter 140, and a transmission light source 150.

The local oscillation light source 130 generates a local oscillation light LO, which is an optical continuous wave of the wavelength and the optical power that are set by the wavelength conversion control unit 220, and outputs the generated local oscillation light LO to the optical frequency shifter 140. The transmission light source 150 generates a transmission light PO, which is an optical continuous wave of the wavelength and the optical power that are set by the wavelength conversion control unit 220, and outputs the generated transmission light PO to the coherent transmitter front-end unit 120.

The optical frequency shifter 140 is a frequency shift unit that shifts a frequency of an optical signal being input. The optical frequency shifter 140 shifts the frequency of the local oscillation light LO output from the local oscillation light source 130 by a shift amount Δf set by the wavelength conversion control unit 220, and outputs a local oscillation light LOs after the frequency shift to the coherent receiver front-end unit 110. The optical frequency shifter 140 is also a frequency adjustment unit that finely adjusts the frequency of the local oscillation light LO being output from the local oscillation light source 130.

As described with reference to FIG. 5, the coherent receiver front-end unit 110 coherently detects the input optical signal SO1 being input, by the local oscillation light LOs from the optical frequency shifter 140, converts the resultant signal into an analog electric signal SA, and outputs the analog electric signal SA. When the optical frequency shifter 140 performs frequency shift, a frequency of the local oscillation light LOs is the frequency after the frequency shift with respect to the local oscillation light LO, and when the optical frequency shifter 140 does not perform the frequency shift, the frequency of the local oscillation light LOs is the same frequency as the local oscillation light LO. Further, the coherent transmitter front-end unit 120 performs coherent modulation on the analog electric signal SA converted by the coherent receiver front-end unit 110 with the transmission light PO from the transmission light source 150, converts the resultant signal into an output optical signal SO2, and outputs the output optical signal SO2.

For example, the input optical signal SO1 and the output optical signal SO2 are phase-modulated and polarization-multiplexed optical signals. Further, the analog electric signal SA is a signal of four lanes (4 ch) including an XI signal that is an I component (in-phase component) of an X polarization, an XQ signal that is a Q component (quadrature component) of the X polarization, a YI signal that is an I component of a Y polarization, and a YQ signal that is a Q component of the Y polarization.

Wavelength meters 210*a* and 210*b* monitor the wavelength and optical power of the optical signal. The wavelength meter 210*a* (first monitoring unit) includes an optical input terminal for inputting a branched signal acquired by branching the input optical signal SO1 being output from the wavelength selection switch 230. The wavelength meter 210*a* measures the wavelength and the optical power of the branched signal of the input optical signal SO1 being input via the optical input terminal. The wavelength meter 210*a* transmits measurement data indicating a measurement result of the wavelength and the optical power to the wavelength conversion control unit 220 via an internal interface (an internal interface of the optical signal relay unit 5) with the wavelength conversion control unit 220. The wavelength meter 210*a* may include a monitoring unit that monitors the wavelength of the input optical signal SO1 and a monitoring unit that monitors the optical power of the input optical signal SO1.

The wavelength meter 210*b* (second monitoring unit) includes an optical input terminal for inputting a branched wave acquired by branching a local oscillation light LOs, which is an optical continuous wave being output from the optical frequency shifter 140. The wavelength meter 210*b* measures the wavelength and the optical power of the branched wave of the local oscillation light LOs being input via the optical input terminal, and outputs measurement data indicating a measurement result to the wavelength conversion control unit 220 via the internal interface with the wavelength conversion control unit 220. Note that the wavelength meter 210*b* can also be referred to as a monitoring unit that monitors a wavelength of the local oscillation light LOs and a monitoring unit that monitors optical power of the local oscillation light LOs.

The wavelength conversion control unit 220 is a control unit that collectively controls the units constituting the optical signal relay unit 5. The wavelength conversion control unit 220 includes a setting information acquisition unit that acquires setting information from the user interface unit 300 via an external interface (an external interface of the optical signal relay unit 5) with the user interface unit 300. Further, the wavelength conversion control unit 220 includes a measurement result acquisition unit that acquires measurement results from the wavelength meters 210*a* and 210*b* via an internal interface between the wavelength meters 210*a* and 210*b*. Further, the wavelength conversion control unit 220 includes a setting unit that performs setting for each of the wavelength selection switch 230, the local oscillation light source 130, the optical frequency shifter 140, and the transmission light source 150 via the internal interface in response to the acquired setting information and measurement result.

For example, in the control of the wavelength selection switch 230, the wavelength conversion control unit 220 sets a wavelength and an attenuation amount of the optical signal to be selected by the wavelength selection switch 230, based on the setting information acquired from the user interface unit 300. The wavelength conversion control unit 220 may set the wavelength and the attenuation amount of the optical signal to be selected, based on not only the setting information acquired from the user interface unit 300 but also setting information previously registered in the optical signal relay unit 5. Further, the wavelength conversion control unit 220 sets the attenuation amount of the wavelength selection switch 230 in response to the measurement result of the optical power of the input optical signal SO1 by the wavelength meter 210*a*. For example, when the optical power of the input optical signal SO1 is larger than a predetermined value, the wavelength conversion control unit 220 sets the attenuation amount of the wavelength selection switch 230 in such a way that the optical power of the input optical signal SO1 falls below the predetermined value. An attenuator may be connected between the wavelength selection switch 230 and the coherent receiver front-end unit 110, and the attenuation amount of the attenuator may be controlled in response to a measurement result of the power of the input optical signal SO1.

In the control of the local oscillation light source 130, the wavelength conversion control unit 220 sets the wavelength and the optical power of the local oscillation light LO to be output from the local oscillation light source 130, based on the setting information acquired from the user interface unit 300. The wavelength conversion control unit 220 may set the wavelength and the optical power of the local oscillation light LO, based on not only the setting information acquired from the user interface unit 300 but also the setting information registered in the optical signal relay unit 5 in advance. Further, the wavelength conversion control unit 220 controls the output optical power of the local oscillation light source 130 in response to the measurement result of the optical power of the input optical signal SO1 by the wavelength meter 210*a*. For example, when the optical power of the input optical signal SO1 is smaller than a predetermined value, the wavelength conversion control unit 220 sets output optical power of the local oscillation light source 130 in such a way that the power of the analog electric signal SA to be output from the coherent receiver front-end unit 110 increases to a predetermined value or more.

In the control of the optical frequency shifter 140, the wavelength conversion control unit 220 controls a frequency shift amount of the optical frequency shifter 140 according to a measurement result of the wavelength of the input optical signal SO1 by the wavelength meter 210*a*. For example, the wavelength conversion control unit 220 sets the frequency shift amount of the optical frequency shifter 140 in such a way that the wavelength of the input optical signal SO1 falls within a predetermined value or a predetermined range when the measurement result of the wavelength of the input optical signal SO1 is outside the predetermined value or the predetermined range.

Further, the wavelength conversion control unit 220 determines whether the control of the optical power with respect to the input optical signal and the control of the optical power or the frequency with respect to the local oscillation light have been completed, according to the measurement result by the wavelength meter 210*a* or the wavelength meter 210*b*. For example, the wavelength conversion control unit 220 controls the attenuation amount in such a way that the optical power of the input optical signal SO1 decreases with respect to the wavelength selection switch 230, and then, when the optical power of the input optical signal SO1 becomes a target value, ends the control of the attenuation amount of the wavelength selection switch 230. When the optical power of the input optical signal SO1 does not decrease to the target value, the wavelength conversion control unit 220 may set the attenuation amount of the wavelength selection switch 230 in such a way that the optical power of the input optical signal SO1 further decreases.

Further, after controlling the local oscillation light source 130 to increase the optical power of the local oscillation light LO, the wavelength conversion control unit 220 ends the control of the output optical power of the local oscillation light source 130 when the optical power of the local oscillation light LOs becomes a target value (power for keeping the output from the coherent receiver front-end unit 110 constant). When the optical power of the local oscillation light LOs does not increase to the target value, the wavelength conversion control unit 220 may set the output optical power of the local oscillation light source 130 in such a way that the optical power of the local oscillation light LO further increases. Note that the optical power of the local oscillation light LO being output from the local oscillation light source 130 may be directly measured, and the completion of the control of the output optical power of the local oscillation light source 130 may be determined according to a measurement result, or the output optical power of the local oscillation light source 130 may be controlled according to the measurement result of the optical power of the local oscillation light LO. Further, after controlling the optical frequency shifter 140 to shift the frequency of the local oscillation light LO, the wavelength conversion control unit 220 ends the control of the frequency shift of the optical frequency shifter when a wavelength of the local oscillation light LOs becomes a target value. When the wavelength of the local oscillation light LOs is not shifted to the target value, the wavelength conversion control unit 220 may set the frequency shift amount of the optical frequency shifter 140 in such a way as to further shift the frequency of the local oscillation light LO.

In the control of the transmission light source 150, the wavelength conversion control unit 220 sets the wavelength and the optical power of the transmission light PO to be output from the transmission light source 150, based on the setting information acquired from the user interface unit 300. The wavelength conversion control unit 220 may set the wavelength and the optical power of the transmission light PO, based on not only the setting information acquired from the user interface unit 300 but also the setting information registered in the optical signal relay unit 5 in advance.

The user interface unit 300 is an interface for a user (an operator) who performs setting and management of the optical relay apparatus 2 and the optical signal relay unit 5. The user interface unit 300 may include an operation unit to be operated by the user, a display unit for displaying information to the user, and the like as necessary. For example, the user interface unit 300 transmits setting information for each unit of the optical signal relay unit 5 to the wavelength conversion control unit 220 via an external interface with the wavelength conversion control unit 220. The user interface unit 300 may transmit the setting information in response to an input from the user, or may transmit the setting information stored in a database or the like in advance.

The user interface unit 300 may be disposed inside the optical relay apparatus 2 or may be disposed outside the optical relay apparatus 2. For example, the user interface unit 300 can be achieved as a function of a network control apparatus that controls the entire optical communication system 1 including the optical relay apparatus 2. As an example of the network control apparatus, a network management system (NMS) for controlling and managing the path and wavelength of the optical communication system 1 may be used.

Figure 7:
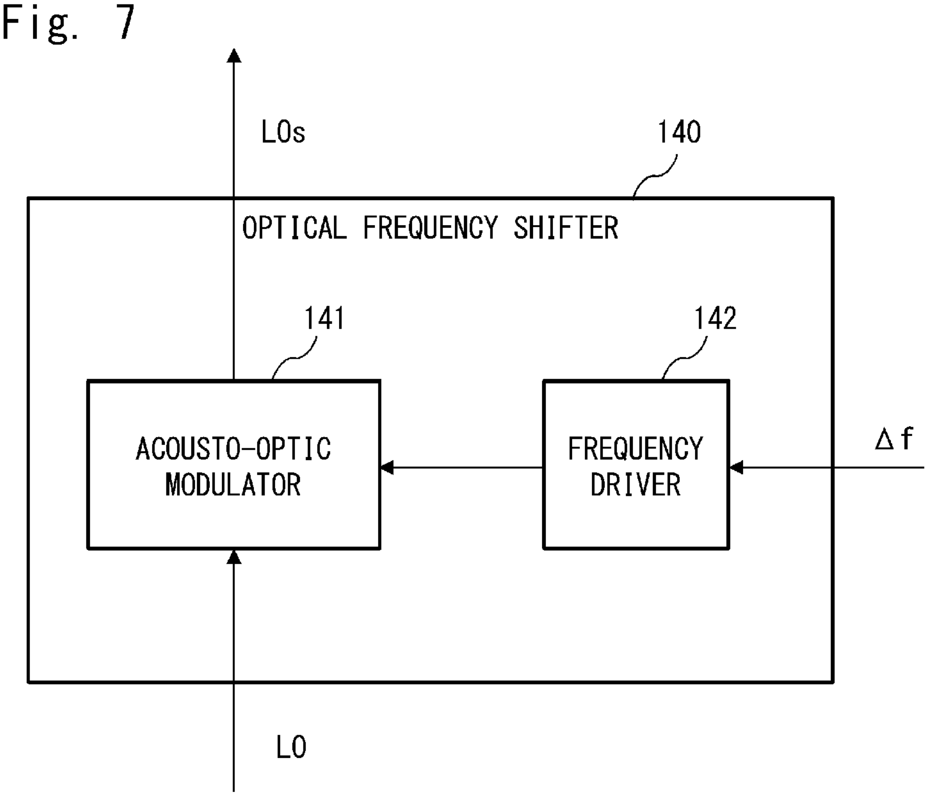
FIG. 7 is a configuration diagram illustrating a configuration example of an optical frequency shifter according to some example embodiments.

FIG. 7 illustrates a configuration example of an optical frequency shifter 140 according to some example embodiments. As illustrated in FIG. 7, for example, the optical frequency shifter 140 includes an acousto-optic modulator 141 and a frequency driver 142. Note that the configuration of FIG. 7 is an example, and as described above, any other means may be used as long as the frequency of the local oscillation light LO can be shifted by a set frequency shift amount.

The frequency driver 142 is a frequency signal generator that generates a frequency signal (such as a sine wave) having a predetermined frequency. The frequency driver 142 generates a frequency signal having a frequency of the frequency shift amount Δf set by the wavelength conversion control unit 220. An acousto-optic effect is generated in response to the frequency signal, whereby the acousto-optic modulator 141 shifts the frequency of the optical signal being input. The acousto-optic modulator 141 shifts the frequency of the local oscillation light LO, which is an optical continuous wave from the local oscillation light source 130, in response to the frequency signal generated by the frequency driver 142, and outputs the local oscillation light LOs shifted by the frequency shift amount Δf to the coherent receiver front-end unit 110.

Figure 8:
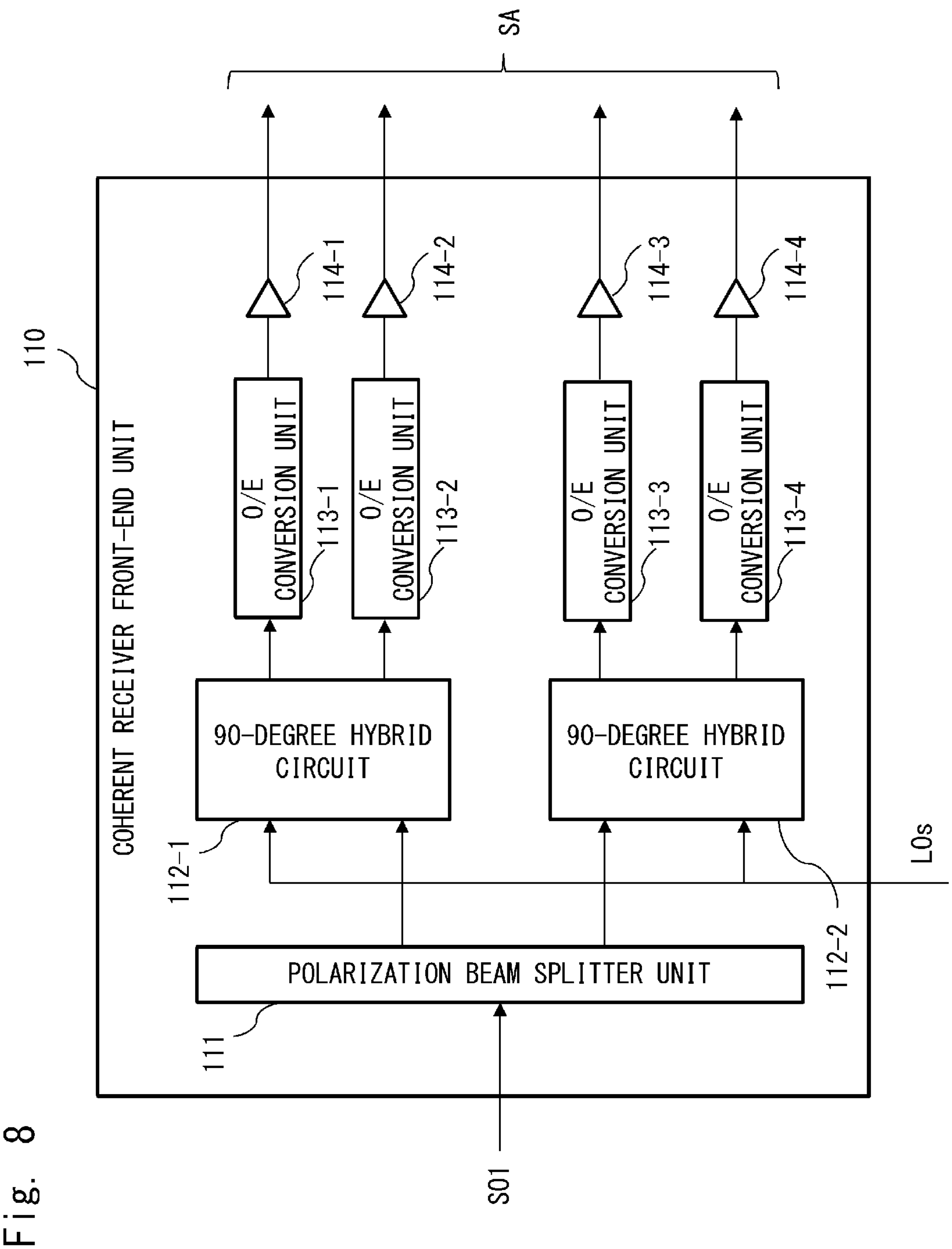
FIG. 8 is a configuration diagram illustrating a configuration example of a coherent receiver front-end unit according to some example embodiments.

FIG. 8 illustrates a configuration example of the coherent receiver front-end unit 110 according to some example embodiments. In the example of FIG. 8, the coherent receiver front-end unit 110 includes a polarization beam splitter unit 111, 90-degree hybrid circuits 112-1 to 112-2, O/E conversion units 113-1 to 113-4, and amplifiers 114-1 to 114-4.

The polarization beam splitter unit 111 polarization-separates (splits) the input optical signal SO1, which is a polarization multiplexing signal being input from the wavelength selection switch 230, into the X polarization and Y polarization. The 90-degree hybrid circuits (coherent optical detectors) 112-1 to 112-2 perform coherent detection by causing the optical signal polarization-separated by the polarization beam splitter unit 111 to interfere with the local oscillation light LOs frequency-shifted by the optical frequency shifter 140. The O/E conversion units 113-1 to 113-4 composed of Photo Diode or the like convert the coherently detected signals into analog electric signals of four lanes. The 90-degree hybrid circuit 112-1 separates the X polarization of the input optical signal SO1 into an I component and a Q component, and then performs photoelectric conversion by the O/E conversion units 113-1 to 113-2 thereby generating an XI signal and an XQ signal. The 90-degree hybrid circuit 112-2 separates the Y polarization of the input optical signal SO1 into an I component and a Q component, and then performs photoelectric conversion by the O/E conversion units 113-3 to 113-4, thereby generating a YI signal and a YQ signal. The amplifier 114-1 to 114-4 amplify the generated XI signal, XQ signal, YI signal, and YQ signal, respectively, and output the amplified XI signal, XQ signal, YI signal, and YQ signal to coherent transmitter front-end unit 120 as analog electric signals SA of four lanes.

Figure 9:
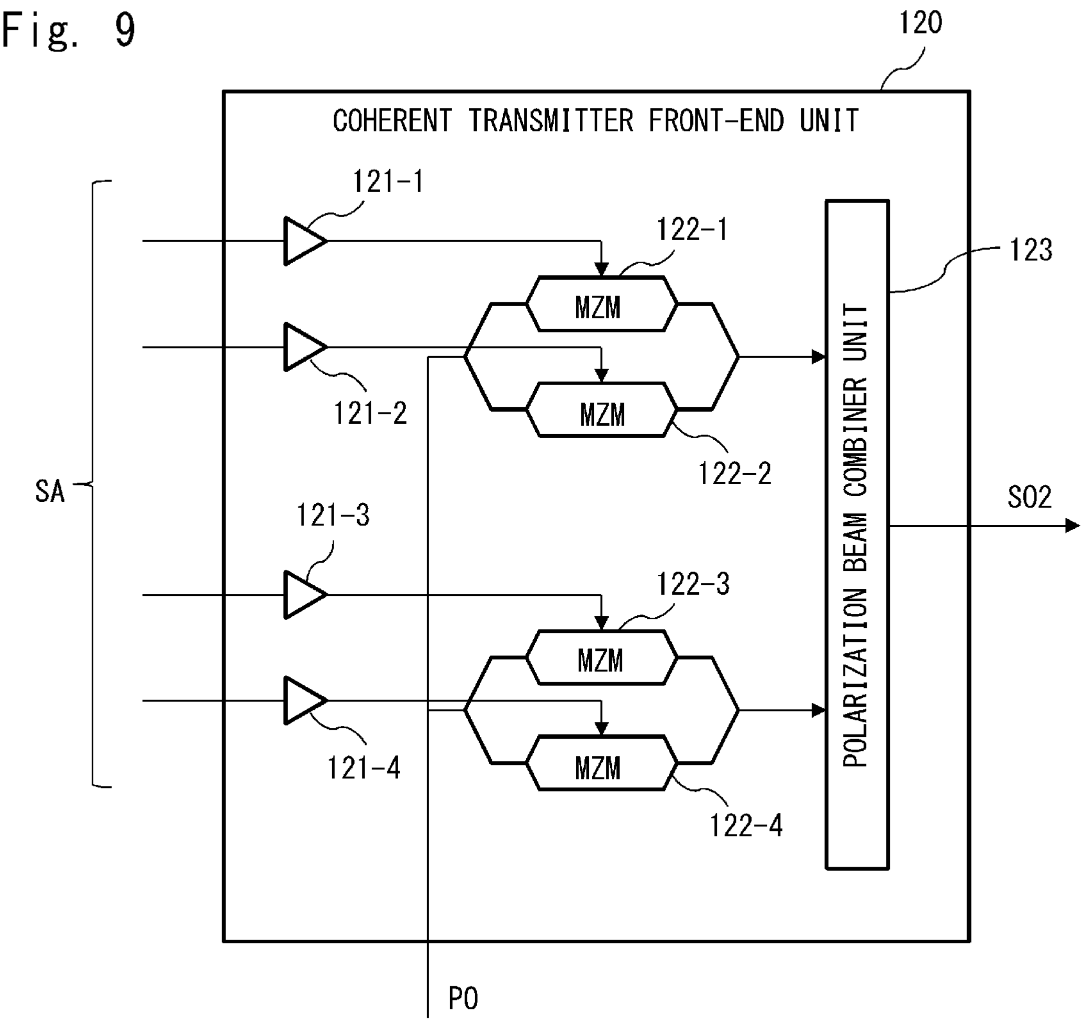
FIG. 9 is a configuration diagram illustrating a configuration example of a coherent transmitter front-end unit according to some example embodiments.

FIG. 9 illustrates a configuration example of the coherent transmitter front-end unit 120 according to some example embodiments. In the example of FIG. 9, the coherent transmitter front-end unit 120 includes amplifiers 121-1 to 121-4, Mach-Zehnder modulators (MZ modulators: MZMs) 122-1 to 122-4, and a polarization beam combiner unit 123.

The amplifiers 121-1 to 121-4 amplify the XI signal, the XQ signal, the YI signal, and the YQ signal that are the analog electric signals SA being output from the coherent receiver front-end unit 110, respectively, and drive the MZ modulators 122-1 to 122-4. The MZ modulators (IQ optical modulators) 122-1 to 122-4 apply IQ modulation to the transmission light PO from the transmission light source 150, according to the XI signal, the XQ signal, the YI signal, and the YQ signal applied thereto, respectively. The MZ modulators 122-1 to 122-2 generate an IQ modulated optical signal of the X polarization, based on the XI signal and the XQ signal via the amplifiers 121-1 to 121-2. The MZ modulators 122-3 to 122-4 generate an IQ modulated optical signal of the Y polarization, based on the YI signal and the YQ signal via the amplifiers 121-3 to 121-4. The polarization beam combiner unit 123 performs polarization multiplexing (combining) of the generated IQ modulated optical signal of the X polarization and the generated IQ modulated optical signal of the Y polarization, and outputs the multiplexed optical signal as the output optical signal SO2.

<Description of Operation>

Next, an example of normal operation of the optical relay apparatus 2 will be described with reference to FIGS. 10 and 11.

Figure 10:
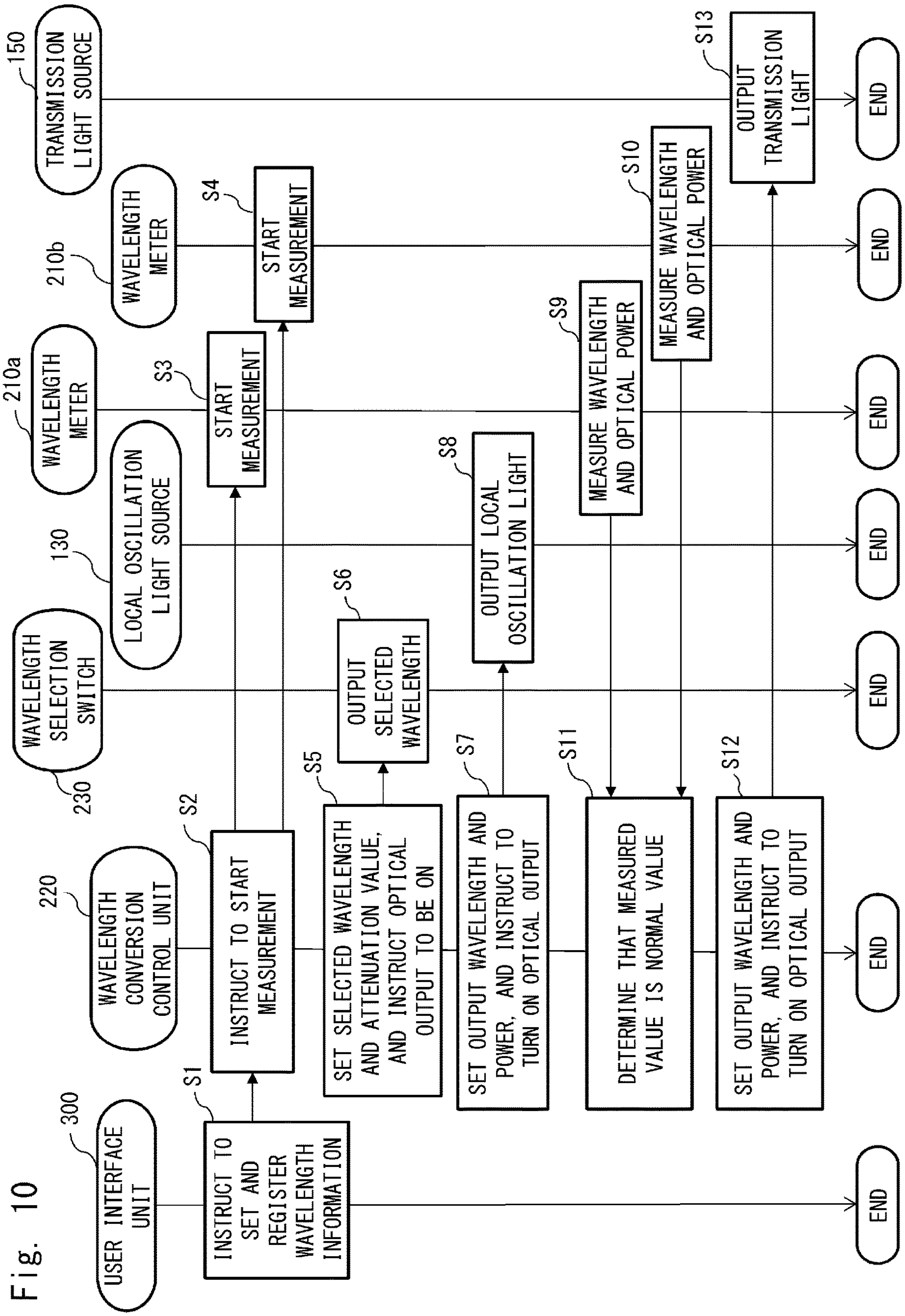
FIG. 10 is a sequence diagram illustrating an operation example of the optical relay apparatus according to some example embodiments at a time of start-up.

A sequence of FIG. 10 illustrates an operation example of the optical relay apparatus 2 according to some example embodiments at a time of start-up. In the example of FIG. 10, when the optical relay apparatus 2 is started up, first, the user interface unit 300 instructs the wavelength conversion control unit 220 to set and register each piece of wavelength information before and after conversion (step S1). Upon receiving the instruction from the user interface unit 300, the wavelength conversion control unit 220 instructs the wavelength meters 210*a* to 210*b* to start polling measurement (step S2). The wavelength meters 210*a* to 210*b* receive an instruction from the wavelength conversion control unit 220, and start polling measurement for the input optical signal SO1 and the local oscillation light LOs (steps S3 to S4). In the polling measurement, the wavelength meters 210*a* and 210*b* measure the wavelength and the optical power of the input optical signal SO1 and the local oscillation light LOs from the start instruction to the stop instruction, and periodically transmit the measured values of the wavelength and the optical power to the wavelength conversion control unit 220.

Subsequently, the wavelength conversion control unit 220 sets, to the wavelength selection switch 230, selected wavelength information which is frequency information of a pre-conversion wavelength set from the user interface unit 300 and information of an initial value 0 of an attenuation value indicating the attenuation amount, and instructs the wavelength selection switch 230 to turn on the optical output (step S5). Upon receiving the instruction from the wavelength conversion control unit 220, the wavelength selection switch 230 selects a wavelength of a frequency set by the selected wavelength information from the wavelength multiplexed signal WO, transmits the selected wavelength with the attenuation amount of the initial value 0 set by the attenuation value, and outputs an input optical signal SO1 that is a single-channel optical signal (step S6).

Subsequently, the wavelength conversion control unit 220 sets, to the local oscillation light source 130, output wavelength information which is the frequency information of the pre-conversion wavelength set from the user interface unit 300 and information of an initial value PLO of optical output power, and instructs the local oscillation light source 130 to turn on the optical output (step S7). Upon receiving an instruction from the wavelength conversion control unit 220, the local oscillation light source 130 outputs a local oscillation light LO that is an optical continuous wave of an optical power having a wavelength set by the output wavelength information and an initial value PLO set by the optical output power (step S8). At this time, the frequency shift amount of the optical frequency shifter 140 is the initial value 0, and the local oscillation light LOs having the same frequency as the local oscillation light LO is output from the optical frequency shifter 140. Accordingly, the coherent receiver front-end unit 110 converts the input optical signal SO1 being output from the wavelength selection switch 230 into an analog electric signal SA using the local oscillation light LOs being output from the optical frequency shifter 140, and starts outputting the converted analog electric signal SA.

After steps S3 and S4, the wavelength meters 210*a* to 210*b* periodically measure branched lights of the input optical signal SO1 from the wavelength selection switch 230 and the local oscillation light LOs from the optical frequency shifter 140, respectively, and transmit the measured wavelength and optical power to the wavelength conversion control unit 220 (steps S9 to S10).

In this example, the wavelength conversion control unit 220 determines that the measured values of the wavelength and the optical power received from the wavelength meters 210*a* to 210*b* are normal values (step S11). For example, the wavelength conversion control unit 220 compares the measurement result of the wavelength of the input optical signal SO1 acquired from the wavelength meter 210*a* with the pre-conversion wavelength set from the user interface unit 300, and determines that the wavelength of the input optical signal SO1 is normal when the measurement result and the set value are the same or a difference between the measurement result and the set value is within a predetermined range. The wavelength conversion control unit 220 compares the measurement result of the optical power of the input optical signal SO1 acquired from the wavelength meter 210*a* with a preset input optical power, and determines that the optical power of the input optical signal SO1 is normal when the measurement result and the set value are the same or a difference between the measurement result and the set value is within a predetermined range.

Further, the wavelength conversion control unit 220 compares the measurement result of the wavelength of the local oscillation light LOs acquired from the wavelength meter 210*b* with the pre-conversion wavelength set from the user interface unit 300, and determines that the wavelength of the local oscillation light LO to be output from the local oscillation light source 130 is normal when the measurement result and the set value are the same or a difference between the measurement result and the set value is within a predetermined range. The wavelength conversion control unit 220 compares the measurement result of the optical power of the local oscillation light LOs acquired from the wavelength meter 210*b* with the set initial value PLO of the local oscillation light power, and determines that the optical power of the local oscillation light LO to be output from the local oscillation light source 130 is normal when the measurement result and the set value are the same or a difference between the measurement result and the set value is within a predetermined range.

When it is determined that the measured values of the wavelength meters 210*a* to 210*b* are normal values, the wavelength conversion control unit 220 sets, to the transmission light source 150, output wavelength information which is frequency information of a converted wavelength set from the user interface unit 300 and information of an initial value $P_{SO}$ of the optical output power, and instructs the transmission light source 150 to turn on the optical output (step S12). Upon receiving the instruction from the wavelength conversion control unit 220, the transmission light source 150 outputs the transmission light PO, which is an optical continuous wave of the wavelength set by the output wavelength information and the optical power of the initial value $P_{SO}$ set by the optical output power (step S13). Accordingly, the coherent transmitter front-end unit 120 converts the analog electric signal SA converted by the coherent receiver front-end unit 110 into an output optical signal SO2 by using the transmission light PO being output from the transmission light source 150, and starts outputting the converted output optical signal SO2.

Figure 11:
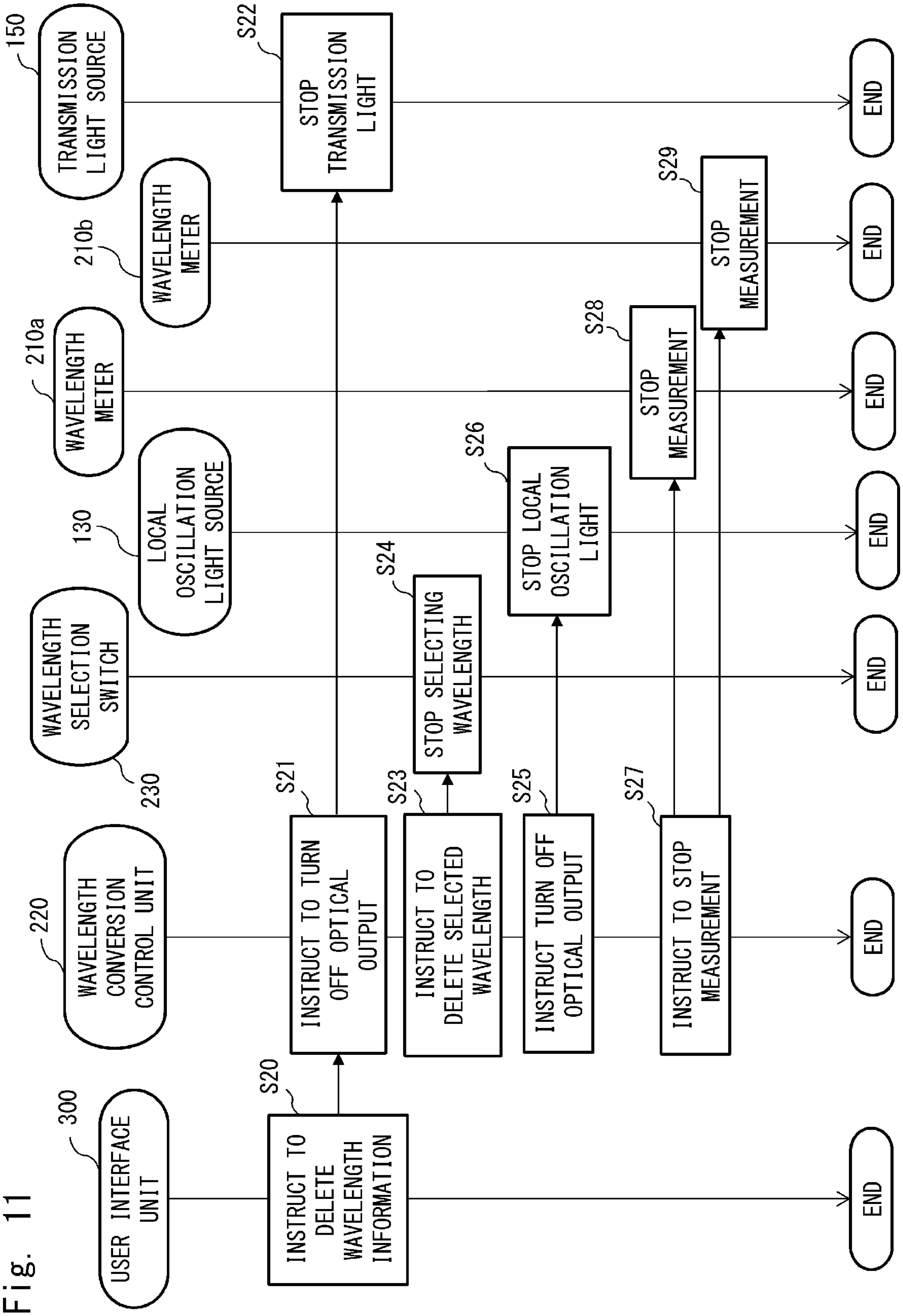
FIG. 11 is a sequence diagram illustrating an operation example of the optical relay apparatus according to some example embodiments at a time of shut-down.

A sequence of FIG. 11 illustrates an operation example of the optical relay apparatus 2 according to some example embodiments at a time of shut-down. In the example of FIG. 11, when the optical relay apparatus 2 is shutdown, the user interface unit 300 instructs the wavelength conversion control unit 220 to delete each piece of wavelength information before and after conversion (step S20). Upon receiving the instruction from the user interface unit 300, the wavelength conversion control unit 220 instructs the transmission light source 150 to turn off the optical output (step S21). The transmission light source 150 receives the instruction from the wavelength conversion control unit 220 and stops the output of the transmission light PO (step S22). As a result, the output of the output optical signal SO2 by the coherent transmitter front-end unit 120 is stopped.

Subsequently, the wavelength conversion control unit 220 instructs the wavelength selection switch 230 to delete the selected wavelength information (step S23). The wavelength selection switch 230 deletes the selected wavelength information in response to an instruction from the wavelength conversion control unit 220. Namely, the wavelength selective switch 230 stops the selection of the set wavelength, sets the optical output to a non-transmissive state, and stops the output of the input light signal SO1 (step S24).

Subsequently, the wavelength conversion control unit 220 instructs the local oscillation light source 130 to turn off the optical output (step S25). The local oscillation light source 130 stops outputting the local oscillation light LO in response to an instruction from the wavelength conversion control unit 220 (step S26). As a result, the output of the local oscillation light LOs from the optical frequency shifter 140 is stopped, and the output of the analog electric signal SA by the coherent receiver front-end unit 110 is stopped.

Subsequently, the wavelength conversion control unit 220 instructs the wavelength meters 210*a* to 210*b* to stop polling measurement (step S27). The wavelength meters 210*a* to 210*b* receive an instruction from the wavelength conversion control unit 220, and stop polling measurement for the input optical signal SO1 and the local oscillation light LOs (steps S28 to S29).

As described above, in the optical signal relay unit 5 of the optical relay apparatus 2, at the time of start-up, the frequency before and after the wavelength conversion from the user interface unit 300 is input to the wavelength conversion unit 100 by selecting one wavelength from the optical wavelength multiplexed signal in response to an instruction for setting, and is converted into a converted frequency in the wavelength conversion unit 100, whereby the converted optical signal can be output to a subsequent-stage network. Further, at the time of shutdown, the optical signal relay unit 5 stops, in response to an instruction to delete the frequency before and after the wavelength conversion from the user interface unit 300, the optical output of the transmission light source 150, stops the wavelength selection from the optical wavelength multiplexed signal, and stops the optical output of the local oscillation light source 130, whereby it is possible to stop the output of the optical signal to the subsequent-stage network.

Next, with reference to FIGS. 12 to 14, an operation example of the optical relay apparatus 2 in a case where characteristics of an optical signal being input are changed will be described.

Figure 12:
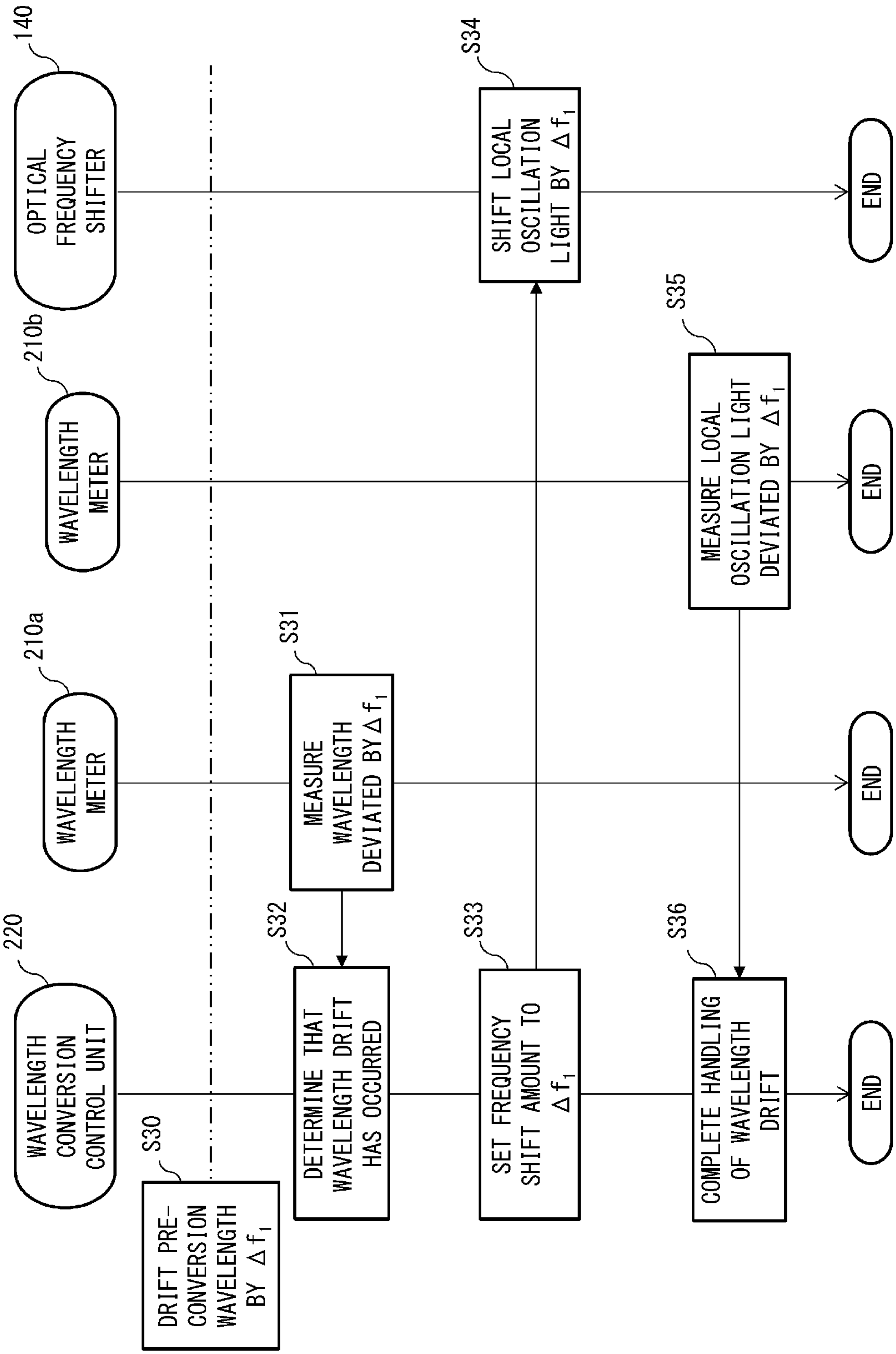
FIG. 12 is a sequence diagram illustrating an operation example of the optical relay apparatus according to some example embodiments in a case where a wavelength of an optical signal drifts.

FIG. 12 illustrates an operation example of the optical relay apparatus 2 according to some example embodiments in a case where the wavelength of the optical signal being input during the wavelength conversion operation after the start-up is drifted. In FIG. 12, it is assumed that after the start-up operation illustrated in FIG. 10, the wavelength (pre-conversion wavelength) of the input optical signal SO1, which is an optical signal before the wavelength conversion, drifts by the frequency $\Delta f_1$ (step S30). Then, the wavelength meter 210*a* monitors the branched light of the input optical signal SO1, which is the output light of the wavelength selection switch 230, measures the wavelength drifted by $\Delta f_1$ from the set value of the pre-conversion wavelength, and transmits the measured wavelength to the wavelength conversion control unit 220 (step S31).

Subsequently, the wavelength conversion control unit 220 receives the measurement result from the wavelength meter 210*a* and determines that a wavelength drift has occurred in the wavelength of the input optical signal SO1 before the wavelength conversion (step S32). For example, the wavelength conversion control unit 220 compares the measurement result of the wavelength of the input optical signal SO1 acquired from the wavelength meter 210*a* with the pre-conversion wavelength set from the user-interface unit 300 at the time of startup, and determines that the wavelength of the input optical signal SO1 drifts by $\Delta f_1$, based on the difference between the measurement result and the set value.

Subsequently, the wavelength conversion control unit 220 sets the determined drift amount $\Delta f_1$ to the optical frequency shifter 140 as the frequency shift amount (step S33). The optical frequency shifter 140 receives an instruction from the wavelength conversion control unit 220, shifts the frequency of the local oscillation light LO, which is an optical continuous wave output from the local oscillation light source 130, by $\Delta f_1$, and outputs the local oscillation light LOs after the frequency shift (step S34). Accordingly, the coherent receiver front-end unit 110 performs coherent detection on the input optical signal SO1 by using the local oscillation light LOs after the frequency shift.

Subsequently, the wavelength meter 210*b* monitors the branched light of the local oscillation light LOs which has been output from the optical frequency shifter 140, measures a wavelength deviated by the frequency $\Delta f_1$ from the set value of the pre-conversion wavelength, and notifies the wavelength conversion control unit 220 of the measured result (step S35).

Subsequently, the wavelength conversion control unit 220 receives, from the wavelength meter 210*b*, a measurement result acquired by deviating the local oscillation light LOs that has been output from the optical frequency shifter 140 by $\Delta f_1$, and completes the handling of the wavelength drift (step S36). For example, the wavelength conversion control unit 220 compares the measurement result of the wavelength of the local oscillation light LOs acquired from the wavelength meter 210*b* with the pre-conversion wavelength set from the user interface unit 300 at the time of startup, and determines that the local oscillation light LOs from the optical frequency shifter 140 is deviated by $\Delta f_1$ from a difference between the measurement result and the set value.

Thereafter, when the drift amount $\Delta f_1$ of the pre-conversion wavelength changes, the sequence of steps S31 to S36 is repeated, and control is continued in such a way that the input wavelength of the input optical signal SO1 before wavelength conversion being input to the wavelength conversion unit 100 matches the wavelength of the local oscillation light LOs being output from the local oscillation light source 130 and input to the coherent receiver front-end unit 110 through the optical frequency shifter 140.

As described above, in the optical signal relay unit 5 of the optical relay apparatus 2, when the wavelength drift occurs in the optical signal of the wavelength selected from the wavelength multiplexed optical signal being input during the wavelength conversion operation after the start-up, the wavelength frequency of the local oscillation light source 130 can be tracked by using the optical frequency shifter 140, and the wavelength of the optical signal before the wavelength conversion can be matched with the wavelength of the local oscillation light.

Figure 13:
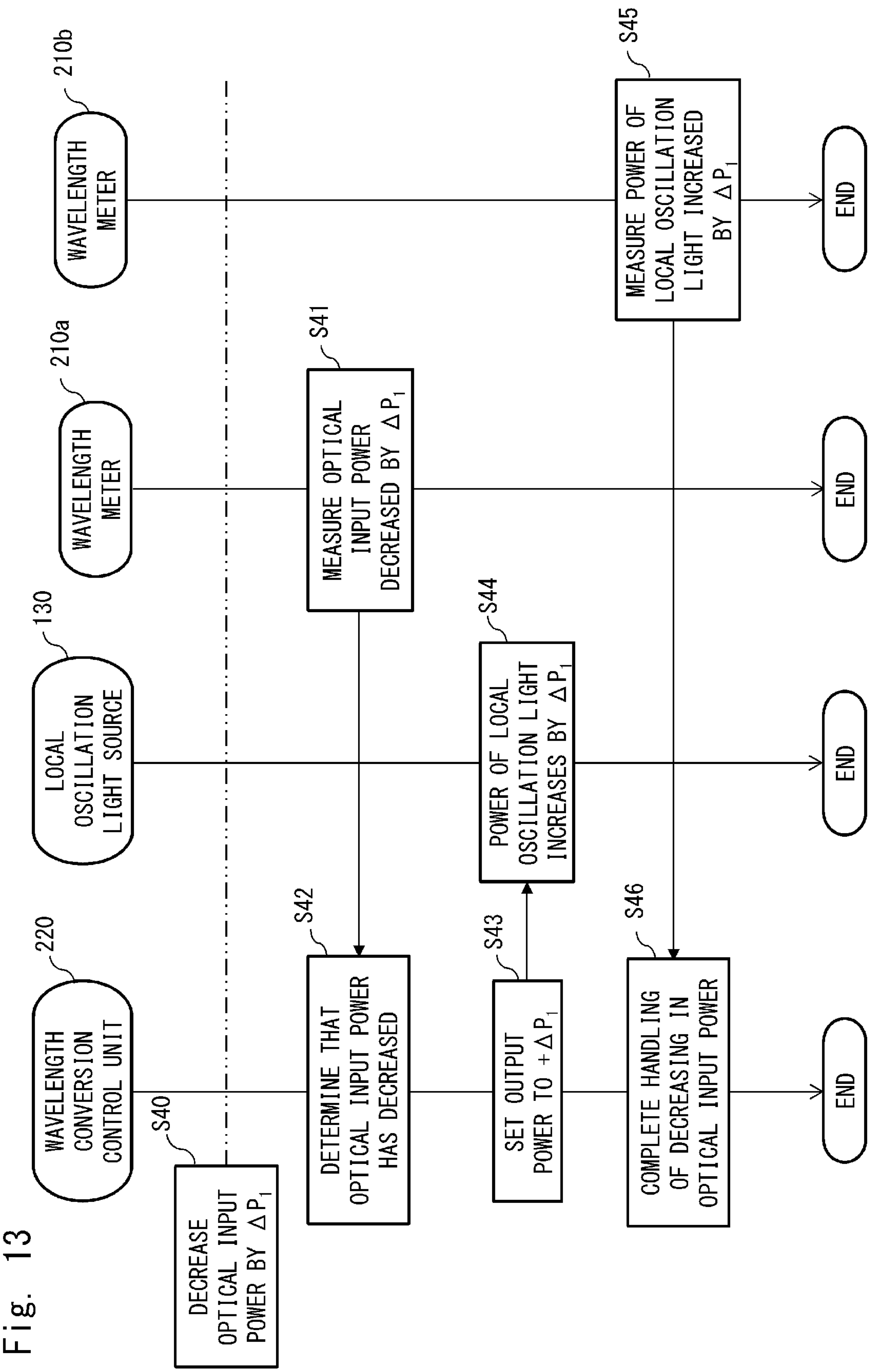
FIG. 13 is a sequence diagram illustrating an operation example of the optical relay apparatus according to some example embodiments in a case where power of an optical signal is decreased.

FIG. 13 illustrates an operation example of the optical relay apparatus 2 according to some example embodiments in a case where the optical power of the optical signal being input during the wavelength conversion operation after the start-up is decreased. In the example of FIG. 13, after the start-up operation illustrated in FIG. 10, it is assumed that the optical power of the input optical signal SO1, which is the optical signal before the wavelength conversion, decreases by $\Delta P_1$ more than prescribed optical input power of the wavelength conversion unit 100 (step S40). Then, the wavelength meter 210*a* monitors the branched light of the input optical signal SO1, which is the output light of the wavelength selection switch 230, measures the optical power that has decreased by API from the prescribed input power of the wavelength conversion unit 100, and transmits the measured result to the wavelength conversion control unit 220 (step S41).

Subsequently, the wavelength conversion control unit 220 receives the measurement result from the wavelength meter 210*a* and determines that the optical power of the input optical signal SO1 before the wavelength conversion has decreased (step S42). For example, the wavelength conversion control unit 220 compares the measurement result of the optical power of the input optical signal SO1 acquired from the wavelength meter 210*a* with the prescribed input power of the wavelength conversion unit 100 set in advance, and determines that the optical power of the input optical signal SO1 has decreased by $\Delta P_1$ from the prescribed input power, based on a difference between the measurement result and the set value.

Subsequently, the wavelength conversion control unit 220 sets the optical power of the local oscillation light LO to increase by API with respect to the local oscillation light source 130 (step S43). Specifically, the optical power of the local oscillation light source 130 is set to an initial value $P_{LO}+\Delta P_1$. In response to the instruction from the wavelength-conversion control unit 220, the local oscillation light source 130 changes the output power of the local oscillation light LO to the initial value $P_{LO}+\Delta P_1$, and increases the output power by $\Delta P_1$ (step S44). Accordingly, the optical power of the local oscillation light LOs via the optical frequency shifter 140 similarly increases, and the coherent receiver front-end unit 110 performs coherent detection on the input optical signal SO1 by using the local oscillation light LOs whose optical power has increased.

Subsequently, the wavelength meter 210*b* monitors the branched light of the local oscillation light LOs that has been output from the optical frequency shifter 140, measures the optical power that has increased by $\Delta P_1$ from the initial value $P_{LO}$, and notifies the wavelength conversion control unit 220 of the measured result (step S45).

Subsequently, the wavelength conversion control unit 220 receives, from the wavelength meter 210*b*, a measurement result acquired by increasing the optical power of the local oscillation light LOs that have been output from the optical frequency shifter 140 by $\Delta P_1$, and completes the handling of decrease in the optical input power (step S46). For example, the wavelength conversion control unit 220 compares the measurement result of the optical power of the local oscillation light LOs acquired from the wavelength meter 210*b* with the initial value $P_{LO}$ set to the local oscillation light source 130 at the time of startup, and determines that the optical power of the local oscillation light Los to be output from the local oscillation light source 130 has increased by $\Delta P_1$, based on a difference between the measurement result and the set value.

As described above, in the optical signal relay unit 5 of the optical relay apparatus 2, when decrease in optical power occurs in the optical signal of the wavelength selected from the wavelength multiplexed optical signal being input during the wavelength conversion operation after the startup, the optical power of the optical continuous wave being output from the local oscillation light source 130 is increased, whereby the amplitude of the analog electric signal to be output from the coherent receiver front-end unit 110 can be controlled to be constant.

Figure 14:
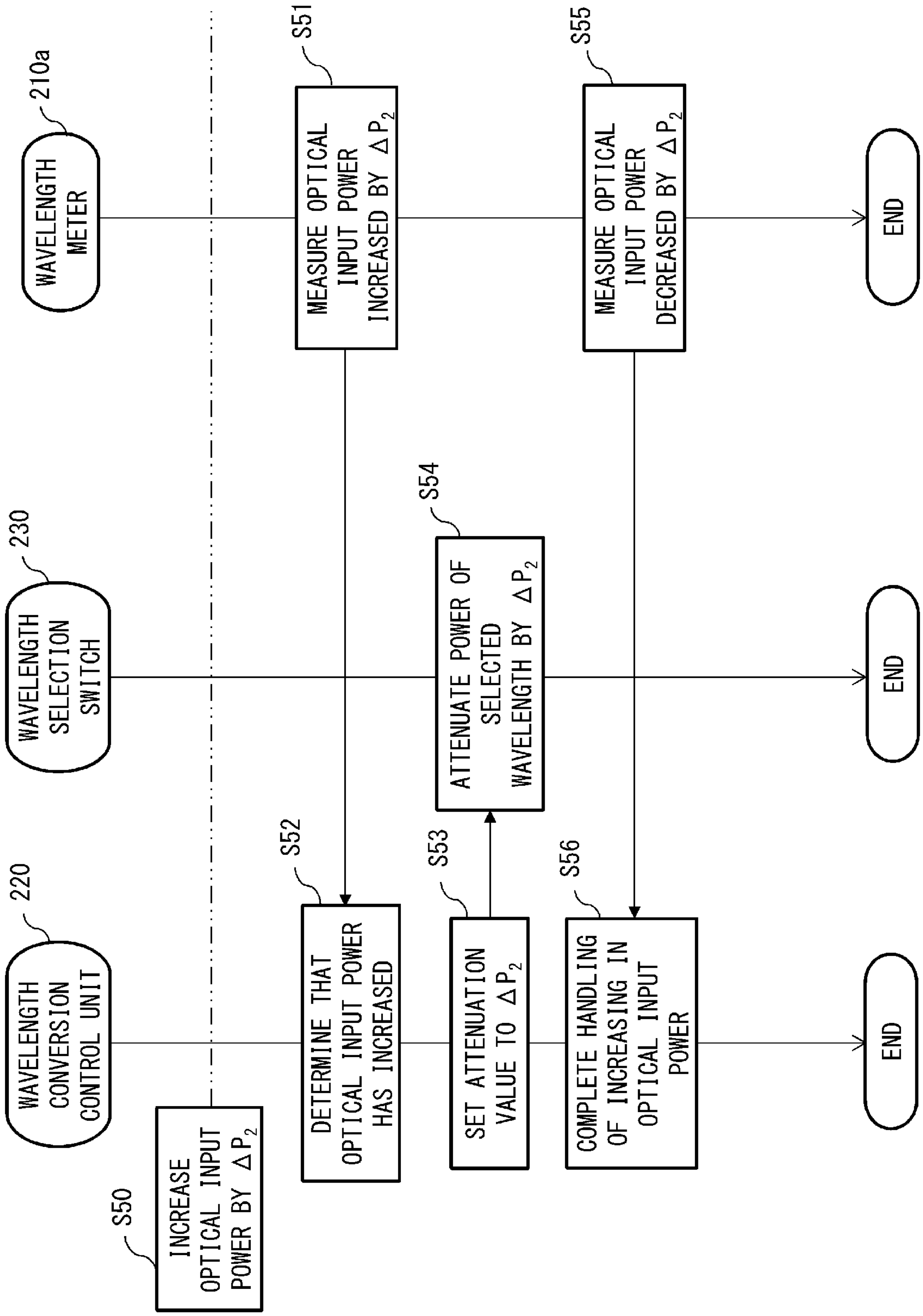
FIG. 14 is a sequence diagram illustrating an operation example of the optical relay apparatus according to some example embodiments in a case where the power of the optical signal is increased.

FIG. 14 illustrates an operation example of the optical relay apparatus 2 according to some example embodiments when the optical power of the optical signal being input during the wavelength conversion operation after the start-up is increased. In the example of FIG. 14, it is assumed that after the start-up operation illustrated in FIG. 10, the optical power of the input optical signal SO1, which is the optical signal before the wavelength conversion, increases more than the prescribed optical input power of the wavelength conversion unit 100 by $\Delta P_2$ (step S50). Then, the wavelength meter 210*a* monitors the branched light of the input optical signal SO1, which is the output light of the wavelength selection switch 230, measures the optical power increased by $\Delta P_2$ from the prescribed input power of the wavelength conversion unit 100, and transmits a measured result to the wavelength conversion control unit 220 (step S51).

Subsequently, the wavelength conversion control unit 220 receives the measurement result from the wavelength meter 210*a* and determines that the optical power of the input optical signal SO1 before the wavelength conversion has increased (step S52). For example, the wavelength conversion control unit 220 compares the measurement result of the optical power of the input optical signal SO1 acquired from the wavelength meter 210*a* with the prescribed input power of the wavelength conversion unit 100 set in advance, and determines that the optical power of the input optical signal SO1 has increased by $\Delta P_2$ from the prescribed input power, based on a difference between the measurement result and the set value.

Subsequently, the wavelength conversion control unit 220 sets the attenuation value to the $\Delta P_2$ with respect to the wavelength selection switch 230 (step S53). The wavelength selection switch 230 attenuates the optical power of the input optical signal SO1 for wavelength selection and output by $\Delta P_2$ in response to an instruction from the wavelength conversion control unit 220 (step S54). Accordingly, the coherent receiver front-end unit 110 performs coherent detection on the input optical signal SO1 whose optical power has decreased.

Subsequently, the wavelength meter 210*a* monitors the branched light of the input optical signal SO1 that has been output from the wavelength selection switch 230, measures the optical power having decreased by $\Delta P_2$, i.e., the optical power of the input optical signal SO1 having reached the prescribed input power of the wavelength conversion unit 100, and transmits a measured result to the wavelength conversion control unit 220 (step S55).

Subsequently, the wavelength conversion control unit 220 receives, from the wavelength meter 210*a*, the measurement result that the optical power of the input optical signal SO1 has reached the prescribed input power of the wavelength conversion unit 100, and completes the handling of increase in the optical input power (step S56). For example, the wavelength conversion control unit 220 compares the measurement result of the optical power of the input optical signal SO1 acquired from the wavelength meter 210*a* with the prescribed input power of the wavelength conversion unit 100 set in advance, and determines that the optical power of the input optical signal SO1 has decreased to the prescribed input power from the difference between the measurement result and the design value.

As described above, in the optical signal relay unit 5 of the optical relay apparatus 2, when an increase in optical power occurs in the optical signal of the wavelength selected from the wavelength multiplexed signal being input during the wavelength conversion operation after the start-up, the attenuation value of the wavelength selection switch 230 is controlled, whereby the amplitude of the analog electric signal to be output from the coherent receiver front-end unit 110 can be controlled to be constant.

Description of Effects

As described above, according to the optical relay apparatus 2, when a wavelength drift occurs in an optical signal that is input by selecting one wavelength from the wavelength multiplexed signal, the wavelength of the local oscillation light source in the apparatus can be made to follow the wavelength of the optical input signal. As a result, it is possible to prevent deterioration in quality of the optical signal being output from the optical relay apparatus 2, and it is possible to prevent deterioration in a line to the optical network being connected to the subsequent stage.

In addition, when a decrease in optical power occurs in an optical signal that is input by selecting one wavelength from the wavelength multiplexed signal, the optical power of the optical continuous wave being output from the local oscillation light source in the apparatus can be made to increase. As a result, it is possible to prevent deterioration in the quality of the optical signal being output from the optical relay apparatus 2, and it is possible to prevent deterioration in the line to the optical network being connected to the subsequent stage.

Further, when an increase in optical power occurs in an optical signal that is input by selecting one wavelength from the wavelength multiplexed signal, the attenuation value of the wavelength selection switch is controlled, whereby it is possible to prevent deterioration in the quality of the optical signal being output from the optical relay apparatus 2, it is possible to prevent deterioration in the line to the optical network being connected to the subsequent stage.

Second Embodiment

Next, a second example embodiment will be described with reference to the drawings. In the present example embodiment, when a wavelength or optical power of the optical signal being input to the wavelength conversion unit becomes abnormal, it is possible to notify the optical network being connected to the subsequent stage of the abnormality and minimize the influence. Note that the second example embodiment can be implemented in combination with the first example embodiment, but only the second example embodiment may be implemented.

<Description of Configuration>

Figure 15:
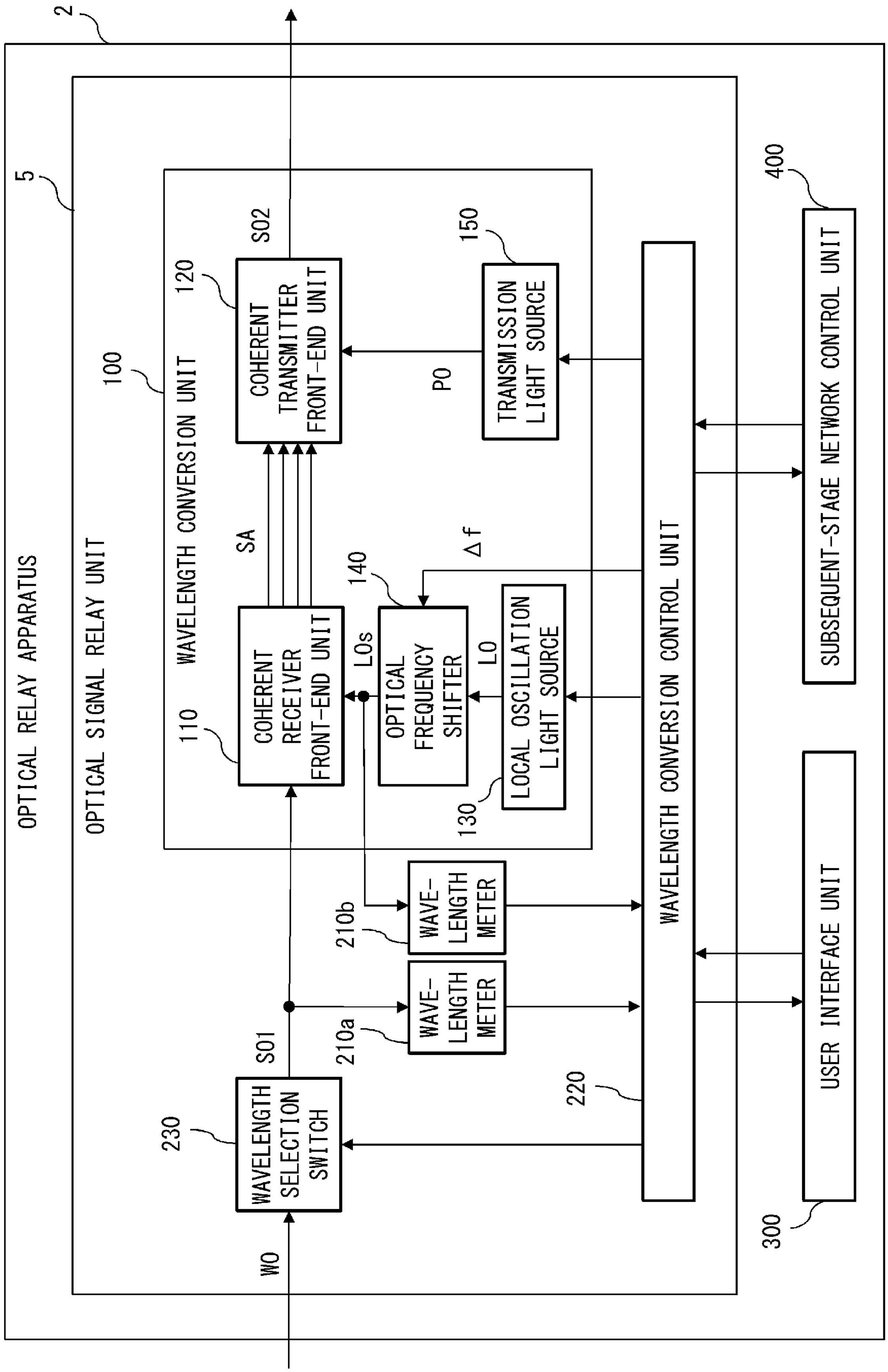
FIG. 15 is a configuration diagram illustrating a specific configuration example of an optical relay apparatus according to some example embodiments.

FIG. 15 illustrates a specific configuration example of an optical relay apparatus 2 according to some example embodiments. In the example of FIG. 15, the optical relay apparatus 2 includes a subsequent-stage network control unit 400 in addition to the configuration of FIG. 6.

The subsequent-stage network control unit 400 is a control apparatus that controls the subsequent-stage network according to optical signals, states, and the like of the optical relay device 2 and the optical signal relay unit 5. The subsequent-stage network is a network being connected to a subsequent stage of the optical relay apparatus 2, and includes an optical relay apparatus 2 being connected to the subsequent stage of the optical relay apparatus 2 (an output terminal of the optical relay apparatus 2) via at least an optical fiber transmission path 4.

The subsequent-stage network control unit 400 receives an alarm indicating an abnormality of the input optical signal from a wavelength conversion control unit 220 via an external interface with the wavelength conversion control unit 220, and notifies and controls necessary information via a control network or the like with the subsequent-stage network. For example, the subsequent-stage network control unit 400 includes a protection unit that executes a protection measure (protection processing) for protecting the subsequent-stage network when an alarm is received from the wavelength conversion control unit 220. The protection of the subsequent-stage network is to protect the optical relay apparatus 2 of the subsequent-stage network from a failure or malfunction when an abnormal optical signal is received. For example, when an optical amplifier that amplifies an optical signal to be received by the optical relay apparatus 2 of the subsequent stage is provided, when the optical power of the optical signal to be input to the optical amplifier suddenly changes, there is a possibility that the optical amplifier fails, and therefore, the optical amplifier can be protected from failure by lowering OFF or gain of the optical amplifier. The subsequent-stage network control unit 400 may notify the subsequent-stage network of an alarm as a protection measure of the subsequent-stage network, or may request the subsequent-stage network to execute processing necessary for protection. When the protection measures are completed, the subsequent-stage network control unit 400 permits the wavelength conversion control unit 220 to stop the signal.

In addition, the subsequent-stage network control unit 400 permits the wavelength conversion control unit 220 to start transmission in a case where the reception start preparation of the subsequent-stage network is completed when the optical relay apparatus 2 is started up. The subsequent-stage network control unit 400 permits the wavelength conversion control unit 220 to stop transmission in a case where reception stop preparation of the subsequent-stage network is completed when the optical relay apparatus 2 is shut down.

Note that the subsequent-stage network control unit 400 may be disposed inside the optical relay apparatus 2 or may be disposed outside the optical relay apparatus 2. Similarly to the user interface unit 300, the subsequent-stage network control unit 400 can also be achieved as a function of a network control apparatus that controls the entire optical communication system 1 including the optical relay apparatus 2, for example. The subsequent-stage network control unit 400 may be the same control apparatus as the user interface unit 300.

In this example, the wavelength conversion control unit 220 includes a notification unit that notifies the subsequent-stage network control unit 400 and the user interface unit 300 of an alarm indicating an abnormality of an input optical signal SO1 via an external interface. For example, the wavelength conversion control unit 220 notifies an alarm when an abnormality of the input optical signal SO1 is detected based on measurement results of the wavelength and the optical power of the input optical signal SO1 by the wavelength meter 210*a*.

Further, the wavelength conversion control unit 220 controls start and stop timings of an output of the output optical signal SO2 from a wavelength conversion unit 100 in conjunction with the subsequent-stage network. For example, the wavelength conversion control unit 220 performs control in such a way as to start an output of the output optical signal SO2 from a coherent transmitter front-end unit 120 in a case where preparation for the reception start of the subsequent-stage network is completed when the optical relay apparatus 2 is started up. In other words, the wavelength conversion control unit 220 transmits the transmission preparation completion of the optical signal relay unit to the subsequent-stage network control unit 400 when the optical relay apparatus 2 is started up, and further, when receiving the transmission start permission from the subsequent-stage network control unit 400, controls to start an output of transmission light PO from a transmission light source 150. In addition, the wavelength conversion control unit 220 performs control in such a way as to stop the output of the output optical signal SO2 from the coherent transmitter front-end unit 120 in a case where preparation for stopping the reception of the subsequent-stage network is completed when the optical relay apparatus 2 is shut down. In other words, the wavelength conversion control unit 220 transmits the transmission stop preparation of the optical signal relay unit 5 to the subsequent-stage network control unit 400 when the optical relay apparatus 2 is shut down, and further, when receiving the transmission stop permission from the subsequent-stage network control unit 400, controls to stop the output of the transmission light PO from the transmission light source 150. Note that other configurations are similar to the configuration example described in the first example embodiment.

<Description of Operation>

Next, an example of normal operation of the optical relay apparatus 2 will be described with reference to FIGS. 16 and 17.

Figure 16:
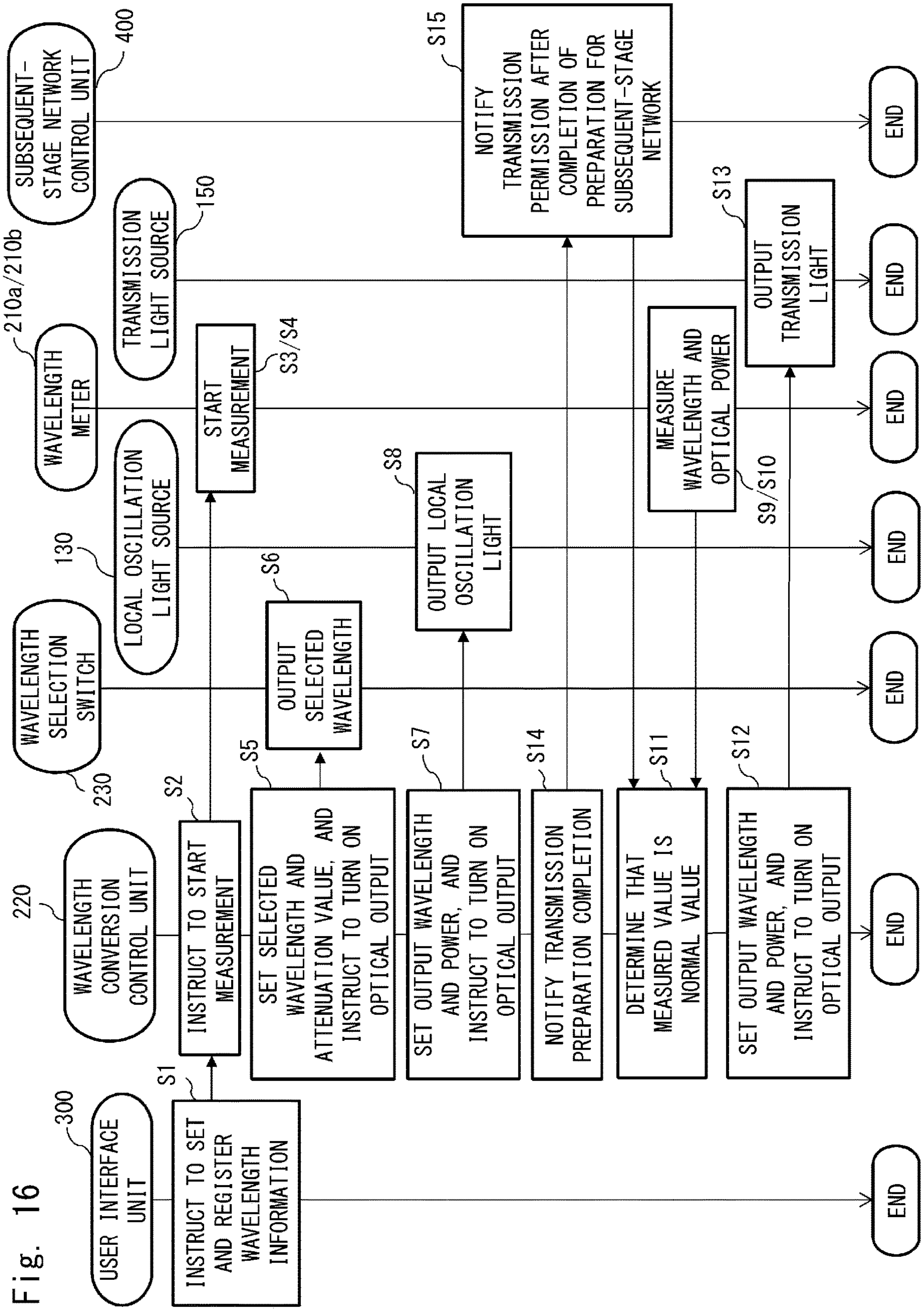
FIG. 16 is a sequence diagram illustrating an operation example of the optical relay apparatus according to some example embodiments at a time of start-up.

A sequence of FIG. 16 illustrates an operation example of the optical relay apparatus 2 according to some example embodiments at the time of start-up. Steps S1 to S13 in FIG. 16 are similar to those in FIG. 10, and therefore operations different from those in FIG. 10 will be mainly described.

In the example of FIG. 16, the user interface unit 300 sets the wavelength information before and after the conversion (step S1), the wavelength meters 210*a* and 210*b* start measurement in response to the instruction from the wavelength conversion control unit 220 (steps S2 to S4), the wavelength selection switch 230 outputs the input optical signal SO1 of the selected wavelength in response to the instruction from the wavelength conversion control unit 220 (steps S5 to S6), and the local oscillation light source 130 outputs the local oscillation light LO in response to the instruction from the wavelength conversion control unit 220 (steps S7 to S8).

Subsequently, the wavelength conversion control unit 220 notifies the subsequent-stage network control unit 400 of transmission preparation completion (step S14). Upon receiving the transmission preparation completion notification from the wavelength conversion control unit 220, the subsequent-stage network control unit 400 notifies the wavelength conversion control unit 220 of permission to transmit the optical signal after the reception start preparation of the subsequent-stage network is completed (step S15). For example, the subsequent-stage network control unit 400 may request the optical relay apparatus 2 of the subsequent stage to start reception, and may determine that the preparation of the subsequent-stage network is completed when receiving the reception start preparation completion from the optical relay apparatus 2 of the subsequent stage. The reception start preparation operation of the optical relay apparatus 2 of the subsequent stage includes, for example, ON of an optical amplifier that amplifies an optical signal to be received.

Thereafter, the wavelength meters 210*a* to 210*b* notify the measurement result of the wavelength and the optical power (steps S9 to S10), and the wavelength conversion control unit 220 determines that the measurement result is a normal value (step S11).

In this example, the wavelength conversion control unit 220 sets the frequency information of the converted wavelength and the optical output power to the transmission light source 150 after the measured values of the wavelength and the optical power of each of the wavelength meters 210*a* to 210*b* are normal values and the transmission permission notification of the optical signal is received from the subsequent-stage network control unit 400, and instructs the transmission light source 150 to turn on the optical output (step S12). The transmission light source 150 outputs the transmission light PO in response to the instruction from the wavelength conversion control unit 220 (step S13).

Figure 17:
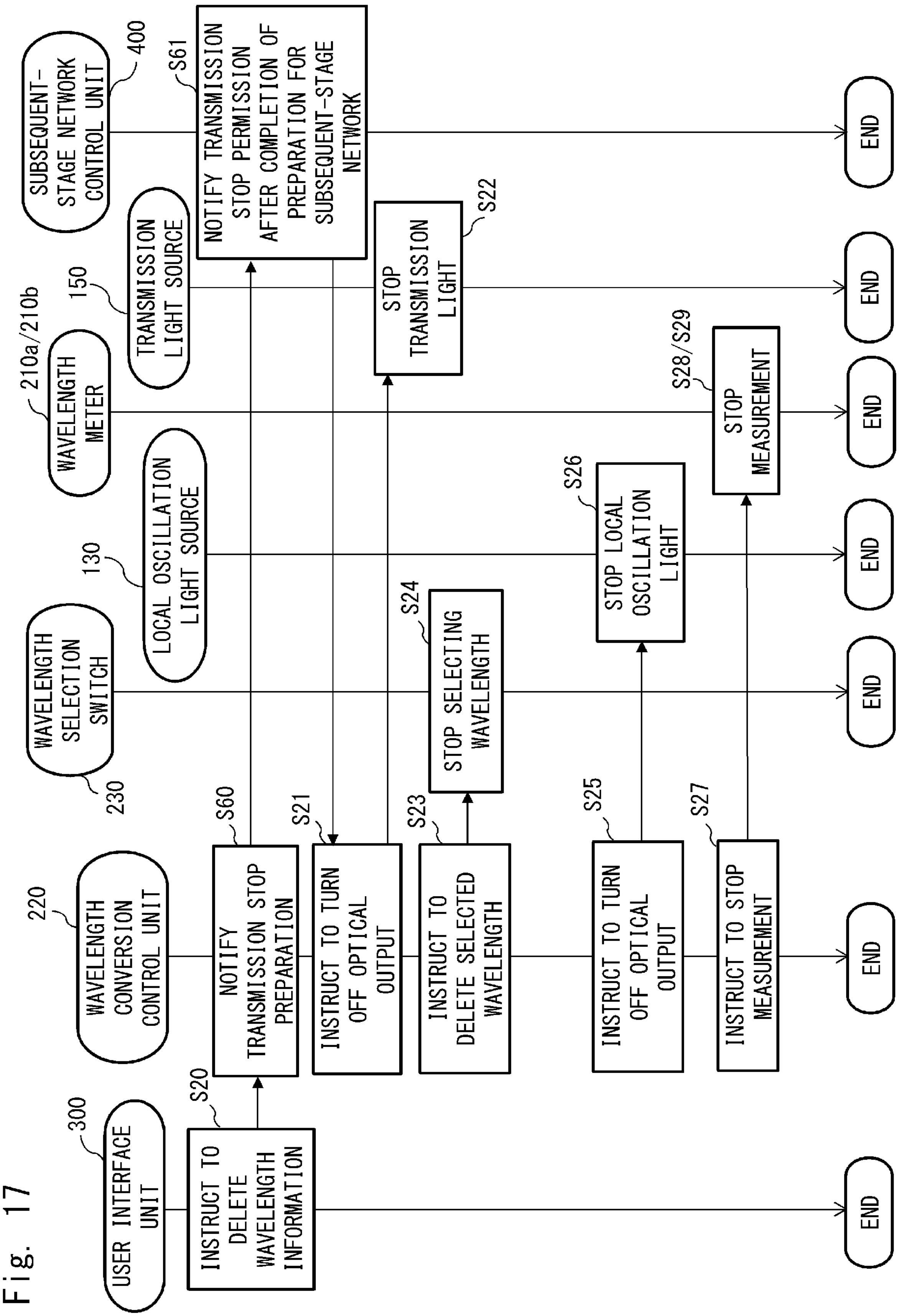
FIG. 17 is a sequence diagram illustrating an operation example of the optical relay apparatus according to some example embodiments at a time of shut-down.

A sequence of FIG. 17 illustrates an operation example of the optical relay apparatus 2 according to some example embodiments at the time of shut-down. Steps S20 to S29 in FIG. 17 are similar to those in FIG. 11, and therefore operations different from those in FIG. 11 will be mainly described.

In the example of FIG. 17, the user interface unit 300 instructs the wavelength conversion control unit 220 to delete the wavelength information before and after the conversion (step S20). Upon receiving the instruction from the user interface unit 300, the wavelength conversion control unit 220 transmits a transmission stop preparation notification to the subsequent stage network control unit 400 (step S60). Upon receiving the transmission stop preparation notification from the wavelength conversion control unit 220, the subsequent-stage network control unit 400 notifies the wavelength conversion control unit 220 of permission to stop the transmission of the optical signal after completion of the reception stop preparation for the subsequent-stage network (step S61). For example, the subsequent-stage network control unit 400 may request the optical relay apparatus 2 of the subsequent stage to stop reception, and may determine that preparation of the subsequent-stage network is completed when reception stop preparation completion is received from the optical relay apparatus 2 of the subsequent stage. The reception stop preparation operation of the optical relay apparatus 2 of the subsequent stage includes, for example, OFF of an optical amplifier that amplifies an optical signal to be received.

In this example, after receiving the transmission stop permission notification from the subsequent-stage network control unit 400, the wavelength conversion control unit 220 stops the operation of each unit. In other words, the wavelength conversion control unit 220 turns off the transmission light source 150 (steps S21 to S22), deletes the selected wavelength information of the wavelength selection switch 230 (steps S23 to S24), turns off the local oscillation light source 130 (steps S25 to S26), and stops the measurement of the wavelength meters 210*a* to 210*b* (steps S27 to S29).

Next, with reference to FIGS. 18 to 19, an operation example of the optical relay apparatus 2 in a case where the characteristic of the optical signal being input becomes abnormal will be described.

Figure 18:
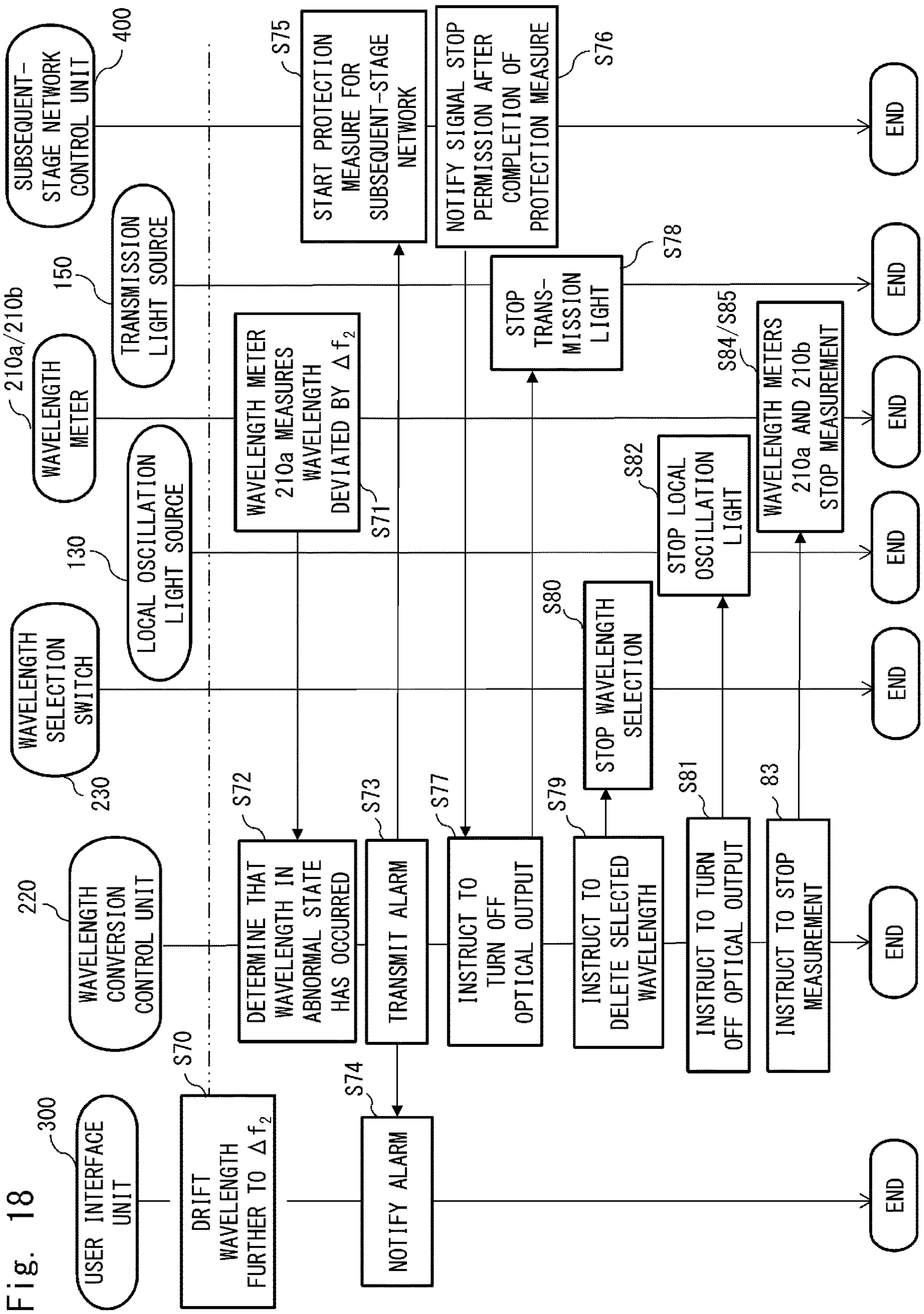
FIG. 18 is a sequence diagram illustrating an operation example of the optical relay apparatus according to some example embodiments in a case where a wavelength of the optical signal becomes abnormal.

FIG. 18 illustrates an operation example of the optical relay apparatus 2 according to some example embodiments in a case where the wavelength of the optical signal being input during wavelength conversion operation after the start-up drifts to an abnormal state. In this example, as in FIG. 12, when the wavelength (the pre-conversion wavelength) of the input optical signal SO1, which is the optical signal before the wavelength conversion, drifts, the frequency shift amount of the optical frequency shifter 140 is controlled according to the drift amount.

In the example of FIG. 18, it is assumed that the pre-conversion wavelength drifts further and deviates to a frequency $\Delta f_2$ affecting adjacent channels (step S70). The reference of the frequency deviation affecting the adjacent channels depends on each wavelength interval of the wavelength multiplexed signal, and is different for each optical network to be connected, and is set in advance at a time of factory shipment or at the time of installation of the optical relay apparatus 2.

Then, the wavelength meter 210*a* monitors the branched light of the input optical signal SO1, which is the output light of the wavelength selection switch 230, measures the wavelength drifted by $\Delta f_2$ from the set value of the pre-conversion wavelength, and transmits the measured result to the wavelength conversion control unit 220 (step S71).

Subsequently, the wavelength conversion control unit 220 receives the measurement result from the wavelength meter 210*a* and determines that the wavelength of the input optical signal SO1 before the wavelength conversion is in an abnormal state (step S72). For example, the wavelength conversion control unit 220 compares the measurement result of the wavelength of the input optical signal SO1 acquired from the wavelength meter 210*a* with the pre-conversion wavelength set from the user interface unit 300 at the time of start-up, and determines that the wavelength of the input optical signal SO1 is in an abnormal state because the wavelength of the input optical signal SO1 drifts to the frequency $\Delta f_2$ that affects the adjacent channels from the difference between the measurement result and the set value.

Subsequently, since the wavelength of the input optical signal SO1 is in the abnormal state, the wavelength conversion control unit 220 transmits an alarm indicating the abnormality of the input optical signal to the user interface unit 300 and the subsequent-stage network control unit 400 (step S73). The wavelength conversion control unit 220 may include a cause of the abnormality in the alarm and transmit the alarm. For example, the cause of the abnormality may include information regarding the wavelength in the abnormal state, a drift amount, and the like.

The user interface unit 300 receives an alarm from the wavelength conversion control unit 220 and notifies the user of the alarm state (step S74). The user interface unit 300 may display the alarm state differently depending on the cause of the abnormality. For example, the alarm state may be highlighted as the drift amount increases.

Further, the subsequent-stage network control unit 400 receives an alarm from the wavelength conversion control unit 220, and starts a measure for protecting the subsequent-stage network in such a way as not to be affected even when the optical output is stopped from the optical signal relay unit 5 (step S75). After completion of the protection measure for the subsequent-stage network, the subsequent-stage network control unit 400 notifies the wavelength conversion control unit 220 of the signal stop permission (step S76). For example, the subsequent-stage network control unit 400 may request a protection measure to the optical relay apparatus 2 of the subsequent stage, and may determine that the protection measure of the subsequent-stage network has been completed when receiving the completion of the protection measure from the optical relay apparatus 2 of the subsequent stage. The protection measure completion operation of the optical relay apparatus 2 of the subsequent stage includes, for example, OFF of an optical amplifier that amplifies an optical signal to be received, lowering of a gain, and the like. The subsequent-stage network control unit 400 notifies the subsequent-stage network of the alarm including the cause of the abnormality, and the subsequent-stage network may take different protection measure according to the cause of the abnormality. For example, the gain of the optical amplifier may be lowered as the drift amount increases.

Subsequently, after receiving the notification of the signal stop permission from the subsequent-stage network control unit 400, the wavelength conversion control unit 220 stops the operation of each unit as in the case of shut-down in FIG. 17. In other words, the wavelength conversion control unit 220 turns off the transmission light source 150 (steps S77 to S78), deletes the selected wavelength information of the wavelength selection switch 230 (steps S79 to S80), turns off the local oscillation light source 130 (steps S81 to S82), and stops the measurement of the wavelength meters 210*a* to 210*b* (steps S83 to S85).

As described above, in the optical signal relay unit 5 of the optical relay apparatus 2, when the pre-conversion wavelength drifts and deviates until it affects the adjacent channel, an alarm is notified to the user interface unit 300 and the subsequent-stage network control unit 400, and after the subsequent-stage network is safely protected, the optical output can be stopped.

Figure 19:
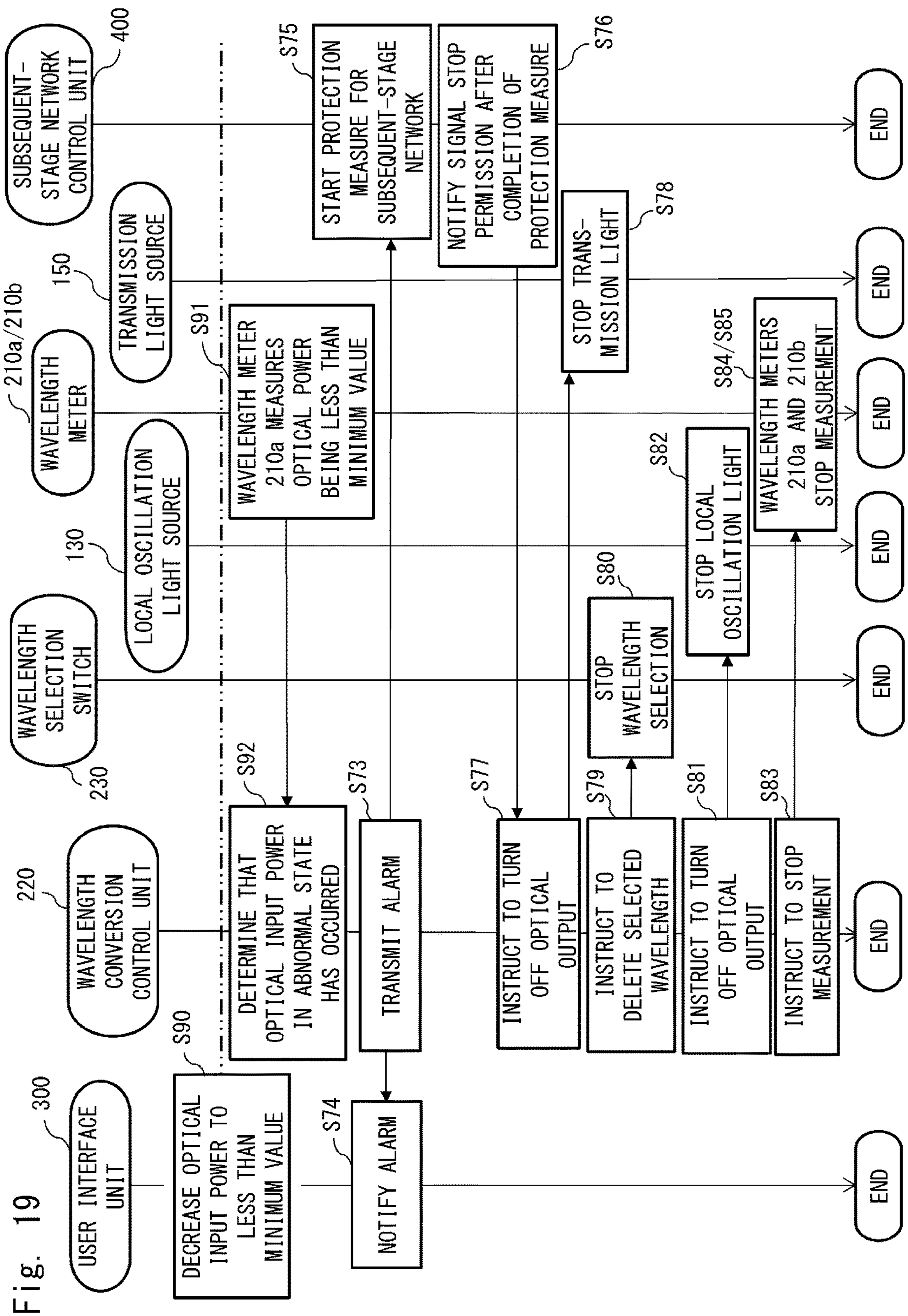
FIG. 19 is a sequence diagram illustrating an operation example of the optical relay apparatus according to some example embodiments in a case where power of the optical signal becomes abnormal.

FIG. 19 illustrates an operation of the optical relay apparatus 2 according to some example embodiments in a case where the optical power of the optical signal being input during the wavelength conversion operation after the start-up is decreased to an abnormal state. In this example, as in FIG. 13, when the optical power of the input optical signal 501, which is an optical signal before wavelength conversion, decreases more than the specified input power, the optical power of the local oscillation light LO to be output by the local oscillation light source 130 is controlled according to the amount of decrease.

In the example of FIG. 19, it is assumed that the optical power of the input optical signal SO1 before the wavelength conversion further decreases and decreases to less than the minimum input power of the wavelength conversion unit 100 (step S90). The minimum input power of the wavelength conversion unit 100 depends on the range of the optical input power of the coherent receiver front-end unit 110, an amplitude range of the output electric signal, and an amplitude range of the input electric signal of the coherent transmitter front-end unit 120. The lower the optical input power to the wavelength conversion unit 100, the lower the quality of the optical signal after the wavelength conversion tends to decrease, but it is set in advance at the time of factory shipment and at the time of installation of the optical relay apparatus 2 as the minimum optical input power that is allowed to deteriorate.

Then, the wavelength meter 210*a* monitors the branched light of the input optical signal SO1, which is the output light of the wavelength selection switch 230, measures the optical power that is less than the minimum input power of the wavelength conversion unit 100, and transmits the measured result to the wavelength conversion control unit 220 (step S91).

Subsequently, the wavelength conversion control unit 220 receives the measurement result from the wavelength meter 210*a*, and determines that the optical power of the input optical signal SO1 before the wavelength conversion is in an abnormal state (step S92). For example, the wavelength conversion control unit 220 compares the measurement result of the optical power of the input optical signal SO1 acquired from the wavelength meter 210*a* with the minimum input power of the wavelength conversion unit 100 set in advance, and determines that the optical power of the input optical signal SO1 is in an abnormal state because the optical power of the input optical signal SO1 is lower than the minimum input power, based on a difference between the measurement result and the set value.

Subsequent operations are the same as those in FIG. 18. Namely, the wavelength conversion control unit 220 transmits an alarm to the user interface unit 300 and the subsequent-stage network control unit 400 (step S73). The wavelength conversion control unit 220 may include the cause of the abnormality, such as the information of the wavelength in the abnormal state and the information of the optical power, in the alarm and transmit the alarm. In response to the reception of the alarm, the user interface unit 300 notifies the user of the alarm state (step S74). For example, the user interface unit 300 may highlight an alarm state as the amount of decrease in the optical power increases. In response to receiving the alarm, the subsequent-stage network control unit 400 starts a protection measure for the subsequent-stage network (step S75), and notifies the wavelength conversion control unit 220 of the signal stop permission (step S76). For example, in the protection measure for the subsequent-stage network, the gain of the optical amplifier may be lowered as the amount of decrease in the optical power increases. Thereafter, the wavelength conversion control unit 220 turns off the transmission light source 150 (steps S77 to S78), deletes the selected wavelength information of the wavelength selection switch 230 (steps S79 to S80), turns off the local oscillation light source 130 (steps S81 to S82), and stops the measurement of the wavelength meters 210*a* to 210*b* (steps S83 to S85).

As described above, in the optical signal relay unit 5 of the optical relay apparatus 2, when the optical power of the input optical signal before the wavelength conversion becomes less than the minimum input power of the wavelength conversion unit 100, an alarm is notified to the user interface unit 300 and the subsequent-stage network control unit 400, and after the subsequent-stage network is safely protected, the optical output can be stopped.

Description of Effects

As described above, according to the optical relay apparatus 2, when the wavelength of the optical signal being input is deviated enough to affect the adjacent channel, the optical network protection by notifying the abnormal state to the optical network being connected to the subsequent stage, after preventing the influence on the subsequent-stage network, it is possible to safely stop the optical output of the optical relay apparatus 2.

In addition, when the optical power of the optical signal being input decreases to less than the minimum input power of the wavelength conversion unit, the optical output of the optical relay apparatus 2 can be safely stopped after the influence on the subsequent-stage network is prevented.

As described with reference to the example embodiments, according to the present disclosure, it is possible to provide an optical communication apparatus, an optical communication system, and an optical communication method that are capable of suppressing quality deterioration of an output signal.

The present disclosure is not limited to the above-described example embodiments, and can be appropriately modified without departing from the scope of the present disclosure. For example, in the wavelength conversion unit of the above-described example embodiment, an example has been described in which a single wavelength (single channel) is input and one wavelength is converted into another wavelength, but a plurality of wavelengths may be input and a plurality of wavelengths may be collectively converted into a plurality of different wavelengths.

Each configuration in the above-described example embodiment is configured by hardware, software, or both, and may be configured by one hardware or software, or may be configured by a plurality of hardware or software. For example, the functions (processing) of the wavelength-conversion control unit 220, the user interface unit 300, the subsequent-stage network control unit 400, and the like may be achieved by a computer having a processor such as a central processing unit (CPU) and a memory as a storage device. For example, a program for performing a method (a communication method or a control method) according to an example embodiment may be stored in a memory, and each of the functions may be achieved by executing a program stored in the memory by a processor.

These programs include instructions (or software codes) that, when loaded into a computer, cause the computer to perform one or more of the functions described in the example embodiments. The program may be stored in a non-transitory computer-readable medium or a tangible storage medium. By way of example and not limitation, computer-readable media or tangible storage media include random-access memory (RAM), read-only memory (ROM), flash memory, solid-state drive (SSD) or other memory techniques, CD-ROM, digital versatile disc (DVD), Blu-ray (registered trademark) disk or other optical disk storages, magnetic cassettes, magnetic tape, magnetic disk storage or other magnetic storage devices. The program may be transmitted on a transitory computer readable medium or a communication medium. By way of example and not limitation, transitory computer-readable media or communication media include electrical, optical, acoustic, or other forms of propagated signals.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims. And each example embodiment can be appropriately combined with at least one of example embodiments.

Each of the drawings or figures is merely an example to illustrate one or more example embodiments. Each figure may not be associated with only one particular example embodiment, but may be associated with one or more other example embodiments. As those of ordinary skill in the art will understand, various features or steps described with reference to any one of the figures can be combined with features or steps illustrated in one or more other figures, for example, to produce example embodiments that are not explicitly illustrated or described. Not all of the features or steps illustrated in any one of the figures to describe an example embodiment are necessarily essential, and some features or steps may be omitted. The order of the steps described in any of the figures may be changed as appropriate.

The whole or part of the example embodiments disclosed above can be described as, but not limited to, the following supplementary notes.

(Supplementary Note 1)

An optical communication apparatus including:

a coherent detection unit configured to coherently detect an input optical signal to be input, based on local oscillation light;

a coherent modulation unit configured to coherently modulate and output the coherently detected signal;

a first monitor unit configured to monitor a characteristic of the input optical signal; and a control unit configured to control a characteristic of the local oscillation light, based on the monitored characteristic.

(Supplementary Note 2)

The optical communication apparatus according to supplementary note 1, wherein the first monitoring unit monitors a wavelength of the input optical signal, and the control unit controls a wavelength of the local oscillation light, based on the monitored wavelength.

(Supplementary Note 3)

The optical communication apparatus according to supplementary note 2, further including a frequency shifter configured to shift a frequency of the local oscillation light, wherein the control unit controls a shift amount of the frequency shifter, based on the monitored wavelength.

(Supplementary Note 4)

The optical communication apparatus according to any one of supplementary notes 1 to 3, wherein the first monitoring unit monitors power of the input optical signal, and the control unit controls power of the local oscillation light or the input optical signal, based on the monitored power.

(Supplementary Note 5)

The optical communication apparatus according to supplementary note 4, further including a local oscillation light source configured to output the local oscillation light, wherein the control unit controls output power of the local oscillation light source, based on the monitored power.

(Supplementary Note 6)

The optical communication apparatus according to supplementary note 4 or 5, further including an attenuator configured to attenuate power of the input optical signal, wherein the control unit controls an attenuation amount of the attenuator, based on the monitored power.

(Supplementary Note 7)

The optical communication apparatus according to supplementary note 6, further including a wavelength selection switch configured to select and output the input optical signal from a wavelength multiplexed signal, wherein the wavelength selection switch includes the attenuator.

(Supplementary Note 8)

The optical communication apparatus according to any one of supplementary notes 1 to 7, further including a second monitoring unit configured to monitor a characteristic of the controlled local oscillation light, wherein the control unit determines whether control of the local oscillation light is completed based on a monitor result of the second monitoring unit.

(Supplementary Note 9)

The optical communication apparatus according to any one of supplementary notes 1 to 8, further including a protection unit configured to execute a protection measure for protecting a subsequent-stage network of the optical communication apparatus, according to a monitor result of the first monitoring unit.

(Supplementary Note 10)

The optical communication apparatus according to supplementary note 9, wherein the control unit stops an optical output from the coherent modulation unit when a protection measure of the subsequent-stage network is completed.

(Supplementary Note 11)

The optical communication apparatus according to supplementary note 9 or 10, wherein the control unit starts an optical output from the coherent modulation unit in a case where preparation for starting reception of the subsequent-stage network is completed when the optical communication apparatus is started up.

(Supplementary Note 12)

The optical communication apparatus according to any one of supplementary notes 9 to 11, wherein the control unit stops an optical output from the coherent modulation unit in a case where preparation for stopping reception of the subsequent-stage network is completed when the optical communication apparatus is shut down.

(Supplementary Note 13)

The optical communication apparatus according to any one of supplementary notes 1 to 12, wherein a wavelength of the input optical signal and a wavelength of an optical signal being output from the coherent modulation unit are different from each other.

(Supplementary Note 14)

An optical communication system including a plurality of optical communication apparatuses, the plurality of optical communication apparatuses each including:

a coherent detection unit configured to coherently detect an input optical signal to be input, based on local oscillation light;

a coherent modulation unit configured to coherently modulate and output the coherently detected signal;

a first monitoring unit configured to monitor a characteristic of the input optical signal; and a control unit configured to control a characteristic of the local oscillation light, based on the monitored characteristic.

(Supplementary Note 15)

The optical communication system according to supplementary note 14, wherein the first monitoring unit monitors a wavelength of the input optical signal, and the control unit controls a wavelength of the local oscillation light, based on the monitored wavelength.

(Supplementary Note 16)

An optical communication method including:

coherently detecting an input optical signal to be input, based on local oscillation light;

coherently modulating and outputting the coherently detected signal;

monitoring a characteristic of the input optical signal; and controlling a characteristic of the local oscillation light, based on the monitored characteristic.

(Supplementary Note 17)

The optical communication method according to supplementary note 16, wherein the monitoring a characteristic of the input optical signal includes monitoring a wavelength of the input optical signal, and the controlling a characteristic of the local oscillation light includes controlling a wavelength of the local oscillation light, based on the monitored wavelength.

Some or all of elements (e.g., structures and functions) specified in Supplementary Notes 2 to 13 dependent on Supplementary Note 1 (e.g., an optical communication apparatus) may also be dependent on Supplementary Note 14 (e.g., an optical communication system) and Supplementary Note 16 (e.g., an optical communication method) in dependency similar to that of Supplementary Notes 2 to 13 on Supplementary Note 1. Some or all of elements specified in any of Supplementary Notes may be applied to various types of hardware, software, and recording means for recording software, systems, and methods.

What is claimed is:

1. An optical communication apparatus comprising:

a coherent detector configured to coherently detect an input optical signal to be input, based on local oscillation light;

a coherent modulator configured to coherently modulate and output the coherently detected signal;

a first monitor configured to select the input optical signal from a wavelength multiplexed signal and monitor a characteristic of the input optical signal; and a controller configured to control a characteristic of the local oscillation light, based on the monitored characteristic.

2. The optical communication apparatus according to claim 1, wherein the first monitor is configured to monitor a wavelength of the input optical signal, and wherein the controller is configured to control a wavelength of the local oscillation light, based on the monitored wavelength.

3. The optical communication apparatus according to claim 2, further comprising a frequency shifter configured to shift a frequency of the local oscillation light, wherein the controller is configured to control a shift amount of the frequency shifter, based on the monitored wavelength.

4. The optical communication apparatus according to claim 1, wherein the first monitor is configured to monitor power of the input optical signal, and wherein the controller is configured to control power of the local oscillation light or the input optical signal, based on the monitored power.

5. The optical communication apparatus according to claim 4, further comprising a local oscillation light source configured to output the local oscillation light, wherein the controller is configured to control output power of the local oscillation light source, based on the monitored power.

6. The optical communication apparatus according to claim 4, further comprising an attenuator configured to attenuate power of the input optical signal, wherein the controller is configured to control an attenuation amount of the attenuator, based on the monitored power.

7. The optical communication apparatus according to claim 6, further comprising a wavelength selection switch configured to select and output the input optical signal from the wavelength multiplexed signal, wherein the wavelength selection switch includes the attenuator.

8. The optical communication apparatus according to claim 1, further comprising a second monitor configured to monitor a characteristic of the controlled local oscillation light, wherein the controller is configured to determine whether control of the local oscillation light is completed, based on a monitor result of the second monitor.

9. The optical communication apparatus according to claim 1, further comprising a protector configured to execute a protection measure for protecting a subsequent-stage network of the optical communication apparatus, according to a monitor result of the first monitor.

10. The optical communication apparatus according to claim 9, wherein the controller is configured to stop an optical output from the coherent modulator when a protection measure of the subsequent-stage network is completed.

11. The optical communication apparatus according to claim 9, wherein the controller is configured to start an optical output from the coherent modulator in a case where preparation for starting reception of the subsequent-stage network is completed when the optical communication apparatus is started up.

12. The optical communication apparatus according to claim 9, wherein the controller is configured to stop an optical output from the coherent modulator in a case where preparation for stopping reception of the subsequent-stage network is completed when the optical communication apparatus is shut down.

13. The optical communication apparatus according to claim 1, wherein a wavelength of the input optical signal and a wavelength of an optical signal being output from the coherent modulation unit are different from each other.

14. An optical communication system comprising a plurality of optical communication apparatuses, the plurality of optical communication apparatuses each including:

a coherent detector configured to coherently detect an input optical signal to be input, based on local oscillation light;

a coherent modulator configured to coherently modulate and output the coherently detected signal;

a first monitor configured to select the input optical signal from a wavelength multiplexed signal and monitor a characteristic of the input optical signal; and a controller configured to control a characteristic of the local oscillation light, based on the monitored characteristic.

15. The optical communication system according to claim 14, wherein the first monitor is configured to monitor a wavelength of the input optical signal, and wherein the controller is configured to control a wavelength of the local oscillation light, based on the monitored wavelength.

16. An optical communication method comprising:

coherently detecting an input optical signal to be input, based on local oscillation light;

coherently modulating and outputting the coherently detected signal;

selecting the input optical signal from a wavelength multiplexed signal and monitoring a characteristic of the input optical signal; and controlling a characteristic of the local oscillation light, based on the monitored characteristic.

17. The optical communication method according to claim 16, wherein the monitoring a characteristic of the input optical signal includes monitoring a wavelength of the input optical signal, and wherein the controlling a characteristic of the local oscillation light includes controlling a wavelength of the local oscillation light, based on the monitored wavelength.

* * * * *